United States Patent
Yang et al.

(10) Patent No.: US 9,319,213 B2
(45) Date of Patent: Apr. 19, 2016

(54) METHOD FOR TRANSCEIVING SIGNALS, AND APPARATUS THEREFOR

(71) Applicant: LG Electronics Inc., Seoul (KR)

(72) Inventors: Suckchel Yang, Anyang-si (KR); Joonkui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 51 days.

(21) Appl. No.: 14/395,590

(22) PCT Filed: Apr. 22, 2013

(86) PCT No.: PCT/KR2013/003417
§ 371 (c)(1),
(2) Date: Oct. 20, 2014

(87) PCT Pub. No.: WO2013/157905
PCT Pub. Date: Oct. 24, 2013

(65) Prior Publication Data
US 2015/0078223 A1    Mar. 19, 2015

Related U.S. Application Data

(60) Provisional application No. 61/635,874, filed on Apr. 20, 2012, provisional application No. 61/645,048, filed on May 9, 2012.

(51) Int. Cl.
*H04L 5/14* (2006.01)
*H04L 1/18* (2006.01)
(Continued)

(52) U.S. Cl.
CPC ............ *H04L 5/1469* (2013.01); *H04L 1/1812* (2013.01); *H04L 1/1825* (2013.01);
(Continued)

(58) Field of Classification Search
None
See application file for complete search history.

(56) References Cited

U.S. PATENT DOCUMENTS

2012/0213170 A1*  8/2012  Choi ............... H04L 1/1861 370/329
2012/0307689 A1* 12/2012  Kim ............... H04L 1/1861 370/280
(Continued)

FOREIGN PATENT DOCUMENTS

| KR | 1020090126210 | 12/2009 |
| KR | 1020100138948 | 12/2010 |

(Continued)

OTHER PUBLICATIONS

Author Unknown, Non cross-carrier scheduling for TDD Inter-Band CA, Submission No. R1-121308 to 3GPP TSG-RAN WG1 Meeting No. 68bis, Mar. 30, 2012, pp. 1-4.*

(Continued)

*Primary Examiner* — Christopher Crutchfield
(74) *Attorney, Agent, or Firm* — Dentons US LLP

(57) ABSTRACT

The present invention relates to a wireless communication system. More particularly, the present invention relates to a method for a terminal to perform a HARQ process in which a scheduling cell of a first UL-DL configuration and a P-scheduling cell of a second TDD UL-DL configuration are set in a wireless communication system that supports carrier aggregation (CA), as well as to an apparatus for the method. The method comprises the steps of: receiving a UL grant through the scheduling cell; transmitting data corresponding to the UL grant through the P-scheduling cell according to the HARQ timing of a specific UL-DL configuration; and receiving data acknowledgement information through the scheduling cell according to the HARQ timing of the specific UL-DL configuration.

12 Claims, 13 Drawing Sheets

(51) Int. Cl.
*H04L 5/00* (2006.01)
*H04W 74/00* (2009.01)
*H04W 74/04* (2009.01)

(52) U.S. Cl.
CPC ............ *H04L1/1854* (2013.01); *H04L 1/1861* (2013.01); *H04L 1/1893* (2013.01); *H04L 5/001* (2013.01); *H04L 5/0055* (2013.01); *H04W 74/004* (2013.01); *H04W 74/006* (2013.01); *H04W 74/04* (2013.01)

(56) References Cited

U.S. PATENT DOCUMENTS

| | | | |
|---|---|---|---|
| 2013/0083707 A1* | 4/2013 | Wang | H04W 72/1289 370/280 |
| 2013/0083708 A1* | 4/2013 | Lin | H04L 5/14 370/280 |
| 2013/0114575 A1* | 5/2013 | Fu | H04L 5/0053 370/336 |

FOREIGN PATENT DOCUMENTS

| KR | 1020110134853 | 12/2011 |
|---|---|---|
| KR | 1020110135864 | 12/2011 |
| KR | 1020120017470 | 2/2012 |

OTHER PUBLICATIONS

Author Unknown, Views on open questions for CA with different TDD UL-DL configurations, Submission No. R1-113079 to 3GPP TSG-RAN WG1 Meeting No. 66bis, Mar. 30 Oct. 14, 2011, pp. 1-3.*
Author Unknown, DL/UL HARQ-ACK transmission in CA with different TDD UL-DL configurations, Submission No. R1-113081 to 3GPP TSG-RAN WG1 Meeting No. 66, Mar. 30 Oct. 14, 2011, pp. 1-5.*

* cited by examiner

PHICH/UL grant-PUSCH timing (UL-DL configuration #1)

PUSCH-PHICH/UL grant timing (UL-DL configuration #1)

HARQ processes in UL-DL configuration #1

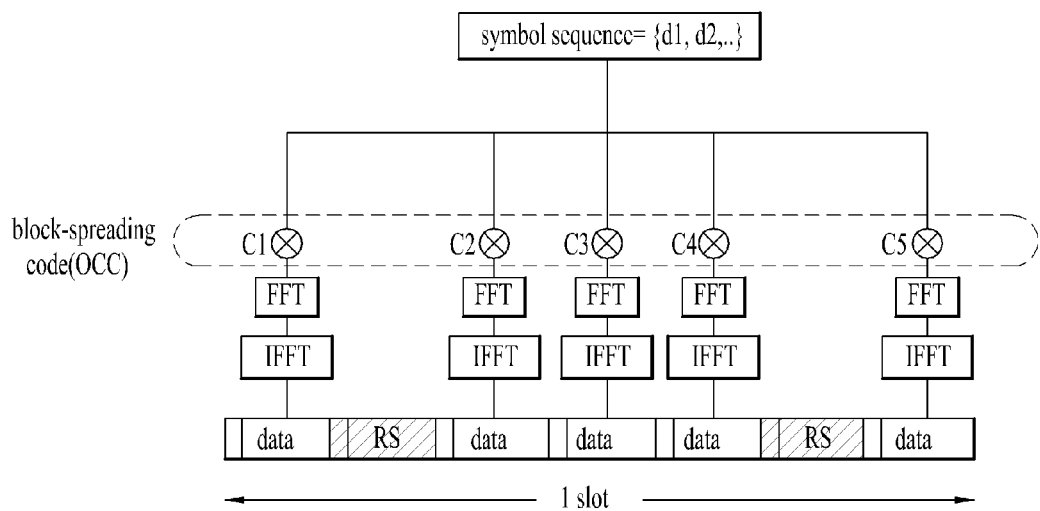

FIG. 16

|  |  | UL-DL configuration of MCC ||||||| 
|---|---|---|---|---|---|---|---|---|
|  |  | 0 | 1 | 2 | 3 | 4 | 5 | 6 |
| UL-DL configuration of SCC | 0 | N/A |  |  |  |  |  |  |
|  | 1 | /// | N/A |  | /// |  |  | /// |
|  | 2 | /// |  | N/A | /// | /// |  | /// |
|  | 3 | /// | /// | /// | N/A |  |  | /// |
|  | 4 | /// |  | /// |  | N/A |  | /// |
|  | 5 | /// |  |  |  |  | N/A | /// |
|  | 6 | /// |  |  |  |  |  | N/A |

FIG. 17

|  |  | UL-DL configuration of MCC ||||||| 
|---|---|---|---|---|---|---|---|---|
|  |  | 0 | 1 | 2 | 3 | 4 | 5 | 6 |
| UL-DL configuration of SCC | 0 | N/A | 0 | 0 | 0 | 0 | 0 | 0 |
|  | 1 | 6 [0] (case 2-2) | N/A | 1 | 6 [0] (case 2-1) | 1 | 1 | 6 [0] (case 2-1) |
|  | 2 | 1 [0] | 1 | N/A | 1 [0] | 1 [0] | 2 | 1 [0] |
|  | 3 | 6 [1] (case 2-3) | 6 [0] (case 2-1) | 3 [0] | N/A | 3 | 3 | 6 [0] (case 2-1) |
|  | 4 | 6 [0] (case 2-3) | 1 | 4 [0] | 3 | N/A | 4 | 1 [0] |
|  | 5 | 1 [0] | 1 | 2 | 3 | 4 | N/A | 1 [0] |
|  | 6 | 6 [1] (case 2-2) | 6 | 6 | 6 | 6 | 6 | N/A |

FIG. 18

| | | UL-DL configuration of MCC | | | | | | |
|---|---|---|---|---|---|---|---|---|
| | | 0 | 1 | 2 | 3 | 4 | 5 | 6 |
| UL-DL configuration of SCC | 0 | N/A | 0 (7) | 0 (7) | 0 (7) | 0 (7) | 0 (7) | 0 (7) |
| | 1 | 6 (5) | N/A | 1 (4) | 6 (5) | 1 (4) | 1 (4) | 6 (5) |
| | 2 | 1 (2) | 1 (2) | N/A | 1 (2) | 1 (2) | 2 (2) | 1 (2) |
| | 3 | 6 [1] (3) | 6 (4) | 3 (3) | N/A | 3 (3) | 3 (3) | 6 (4) |
| | 4 | 6 (3) | 1 (2) | 4 (2) | 3 (2) | N/A | 4 (2) | 1 (2) |
| | 5 | 1 (1) | 1 (1) | 2 (1) | 3 (1) | 4 (1) | N/A | 1 (1) |
| | 6 | 6 [1] (5) | 6 (6) | 6 (6) | 6 (6) | 6 (6) | 6 (6) | N/A |

FIG. 19

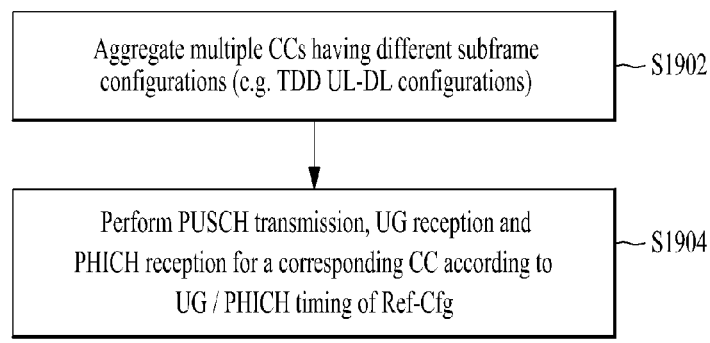

* UG/PHICH timing for UL data transmitted on MCC:
  Ref-Cfg is set to MCC Cfg

* UG/PHICH timing for UL data transmitted on SCC:
  (non-cross-CC scheduling) Ref-Cfg is set to SCC Cfg (Cross-CC scheduling) Ref-Cfg is determined according to UL union-based HARQ scheme
  and UL/DL skipping method is applied according to MCC/SCC combination

METHOD FOR TRANSCEIVING SIGNALS, AND APPARATUS THEREFOR

This application is a 35 USC §371 National Stage entry of International Application No. PCT/KR2013/003417 filed on Apr. 22, 2013, and claims priority to U.S. Provisional Application Nos. 61/635,874 filed on Apr. 20, 2012 and 61/645,048 filed on May 9, 2012, all of which are hereby incorporated by reference in their entireties as if fully set forth herein.

TECHNICAL FIELD

The present invention relates to a wireless communication system and, more specifically, to a method for transmitting and receiving signals in a multi-carrier system supporting time division duplex (TDD) and an apparatus therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently transmitting and receiving signals in a wireless communication system and an apparatus therefor. Another object of the present invention is to provide a method for efficiently transmitting and receiving signals in a multi-carrier system supporting TDD and an apparatus therefor. Yet another object of the present invention is to provide a method for reusing existing signal transmission/reception timing when signal transmission/reception timing is set in a multi-carrier system supporting TDD and an apparatus therefor. Still another object of the present invention is to provide a method for efficiently operating a HARQ process in a multi-carrier system supporting TDD and an apparatus therefor.

The technical problems solved by the present invention are not limited to the above technical problems and those skilled in the art may understand other technical problems from the following description.

Technical Solution

In an aspect of the present invention, a method for performing a hybrid automatic repeat request (HARQ) process by a UE for which a scheduling cell having a first uplink-downlink (UL-DL) configuration and a scheduled cell having a second TDD UL-DL configuration are configured in a wireless communication system includes: receiving a UL grant through the scheduling cell; transmitting, through the scheduled cell, data corresponding to the UL grant according to HARQ timing of a specific UL-DL configuration; and receiving, through the scheduling cell, acknowledgement information for the data according to the HARQ timing of the specific UL-DL configuration, wherein the HARQ timing of the specific UL-DL configuration includes UL grant reception in a first DL subframe (DL SF)=>data transmission in a first UL SF=>acknowledgement information or UL grant reception in a second DL SF=>data transmission in a second UL SF=>acknowledgement information/UL grant reception in a third DL SF=>data transmission in a third UL SF, wherein, when the scheduling cell is not a DL SF at the timing of the second DL SF, the HARQ timing of the specific UL-DL configuration is reset to include UL grant reception in the first DL SF=>data transmission in the first UL SF=>acknowledgement information/UL grant reception in the third DL SF=>data transmission in the third UL SF.

In another aspect of the present invention, provided herein is a UE, for which a scheduling cell having a first uplink-downlink (UL-DL) configuration and a scheduled cell having a second TDD UL-DL configuration are configured, which is configured to perform a HARQ process, which includes: a radio frequency (RF) unit; and a processor, wherein the processor is configured to receive a UL grant through the scheduling cell, to transmit, through the scheduled cell, data corresponding to the UL grant according to HARQ timing of a specific UL-DL configuration and to receive, through the scheduling cell, acknowledgement information for the data according to the HARQ timing of the specific UL-DL configuration, wherein the HARQ timing of the specific UL-DL configuration includes UL grant reception in a first DL subframe (DL SF)=>data transmission in a first UL SF=>acknowledgement information or UL grant reception in a second DL SF=>data transmission in a second UL SF=>acknowledgement information/UL grant reception in a third DL SF=>data transmission in a third UL SF, wherein, when the scheduling cell is not a DL SF at the timing of the second DL SF, the HARQ timing of the specific UL-DL configuration is reset to include UL grant reception in the first DL SF=>data transmission in the first UL SF=>acknowledgement information/UL grant reception in the third DL SF=>data transmission in the third UL SF.

When the scheduling cell is not a DL SF at the timing of the second DL SF, the second UL SF may be reset to UL SF timing closest to the first UL SF, including the first UL SF, in the specific DL-UL configuration, the UL SF timing following the first UL SF.

When the scheduled cell is not a UL SF at the timing of the second UL SF, the HARQ timing of the specific UL-DL configuration may be reset to include UL grant reception in the first DL SF=>UL data transmission in the first UL SF=>acknowledgement information reception in the second DL SF=>UL grant reception in the third DL SF=>data transmission in the third UL SF.

When the scheduled cell is not a UL SF at the timing of the second UL SF, the third DL SF may be reset to DL SF timing closest to the second DL SF, including the second DL SF, in the specific UL-DL configuration, the DL SF timing following the second DL SF.

Subframe configurations according to the UL-DL configuration may be defined as follows.

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |

-continued

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Here, D denotes a downlink subframe, S denotes a special subframe and U denotes an uplink subframe.

The specific UL-DL configuration may be a UL-DL configuration having a smallest number of Us from among UL-DL configurations in which SFs, in which the scheduling cell or the scheduled cell corresponds to U, are all set to U.

Advantageous Effects

According to embodiments of the present invention, it is possible to efficiently transmit and receive signals in a wireless communication system. In addition, it is possible to efficiently transmit and receive signals in a multi-carrier system supporting TDD. Furthermore, it is possible to reuse existing signal transmission/reception timing when signal transmission/reception timing is set in a multi-carrier system supporting TDD. Moreover, it is possible to efficiently operate a HARQ process in a multi-carrier system supporting TDD.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings:

FIG. 14 illustrates a method for transmitting ACK/NACK information using channel selection in a conventional CA TDD system;
FIG. 15 illustrates a slot level PUCCH format 3 structure;
FIG. 16 illustrates an example of setting Ref-Cfg according to MCC/SCC combination;
FIGS. 17 and 18 illustrate examples of setting Ref-Cfg of an SCC according to the present invention;
FIG. 19 illustrates a HARQ process according to the present invention.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is an evolution of 3GPP LTE.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes a DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows a special subframe configuration.

TABLE 2

| Special subframe configuration | Normal cyclic prefix in downlink | | | Extended cyclic prefix in downlink | | |
|---|---|---|---|---|---|---|
| | DwPTS | UpPTS Normal cyclic prefix in uplink | UpPTS Extended cyclic prefix in uplink | DwPTS | UpPTS Normal cyclic prefix in uplink | UpPTS Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

Figure 1:
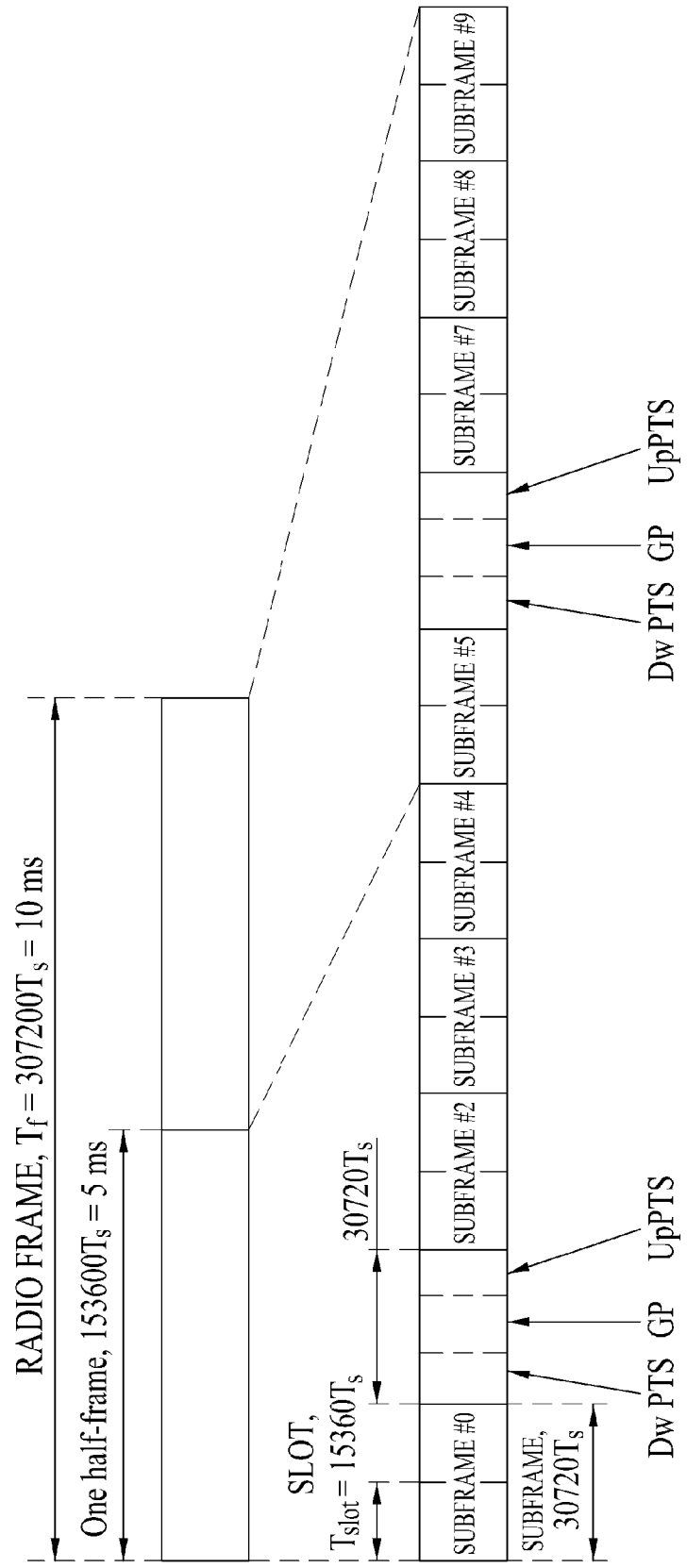
FIG. 1 illustrates a radio frame structure.
Figure 2:
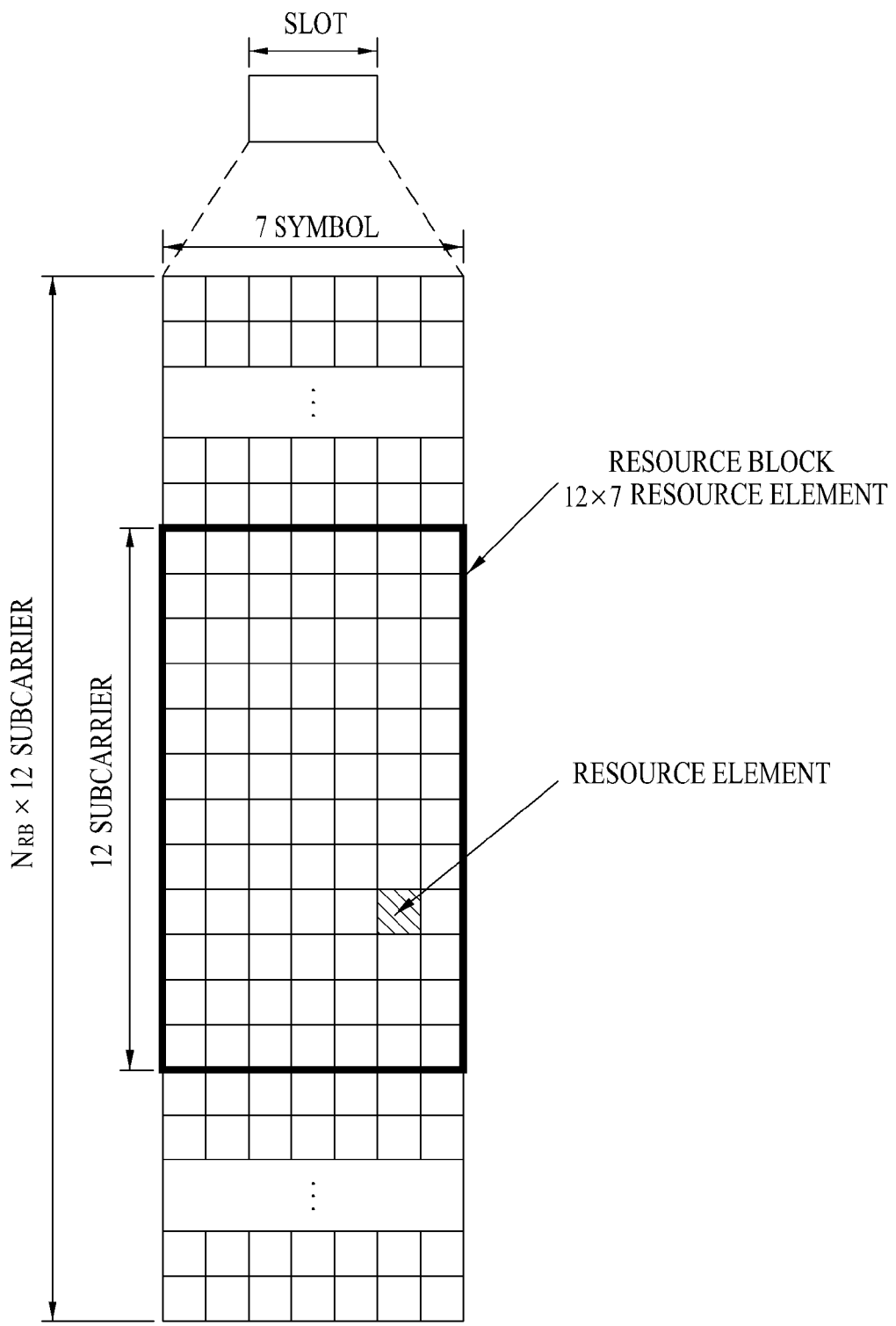
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
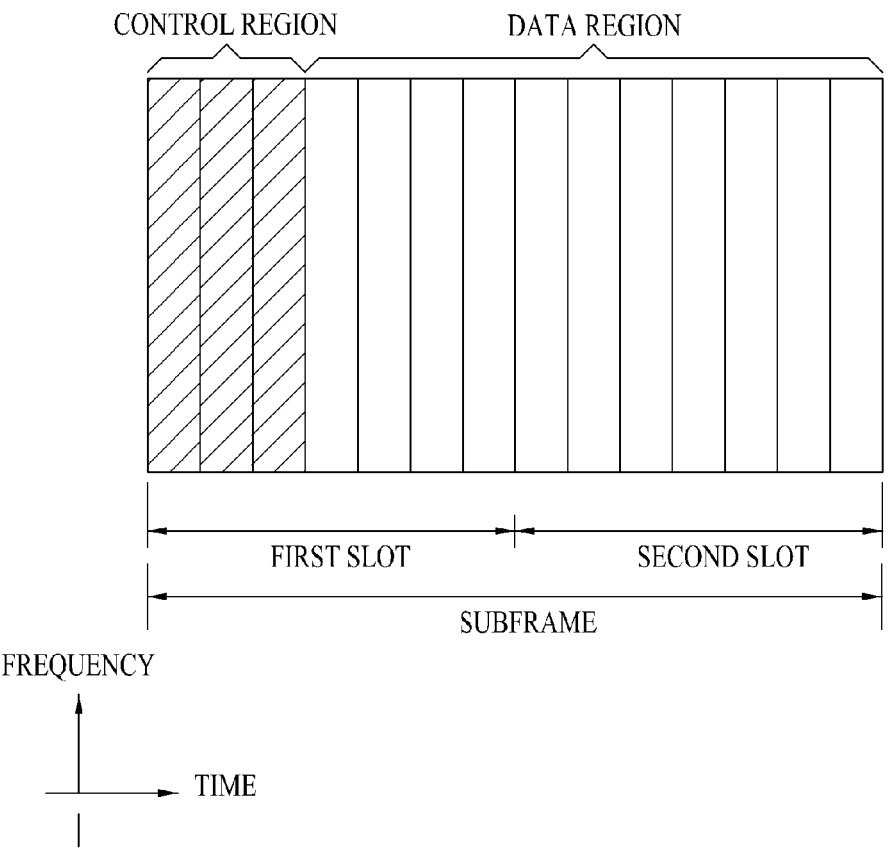
FIG. 3 illustrates a downlink subframe structure.

FIG. 3 illustrates a downlink subframe structure.

Referring to FIG. 3, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode (TM)
•Transmission mode 1: Transmission from a single base station antenna port
•Transmission mode 2: Transmit diversity
•Transmission mode 3: Open-loop spatial multiplexing
•Transmission mode 4: Closed-loop spatial multiplexing
•Transmission mode 5: Multi-user MIMO (Multiple Input Multiple Output)
•Transmission mode 6: Closed-loop rank-1 precoding
•Transmission mode 7: Single-antenna port (port 5) transmission
•Transmission mode 8: Double layer transmission (ports 7 and 8) or single-antenna port (port 7 or 8) transmission
•Transmission modes 9 and 10: Transmission using a maximum of 8 layers (ports 7 to 14) or single antenna port (port 7 or 8)

DCI Format
•Format 0: Resource grants for the PUSCH (Physical Uplink Shared Channel) transmissions (uplink)
•Format 1: Resource assignments for single codeword PDSCH (Physical Downlink Shared Channel) transmissions (transmission modes 1, 2 and 7)
•Format 1A: Compact signaling of resource assignments for single codeword PDSCH (all modes)
•Format 1B: Compact resource assignments for PDSCH using rank-1 closed loop precoding (mode 6)
•Format 1C: Very compact resource assignments for PDSCH (e.g. paging/broadcast system information)
•Format 1D: Compact resource assignments for PDSCH using multi-user MIMO (mode 5)
•Format 2: Resource assignments for PDSCH for closed-loop MIMO operation (mode 4)
•Format 2A: Resource assignments for PDSCH for open-loop MIMO operation (mode 3)
•Format 3/3A: Power control commands for PUCCH and PUSCH with 2-bit/1-bit power adjustments
•Format 4: Resource grants for PUSCH transmission (uplink) in a cell set to a multi-antenna port transmission mode As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
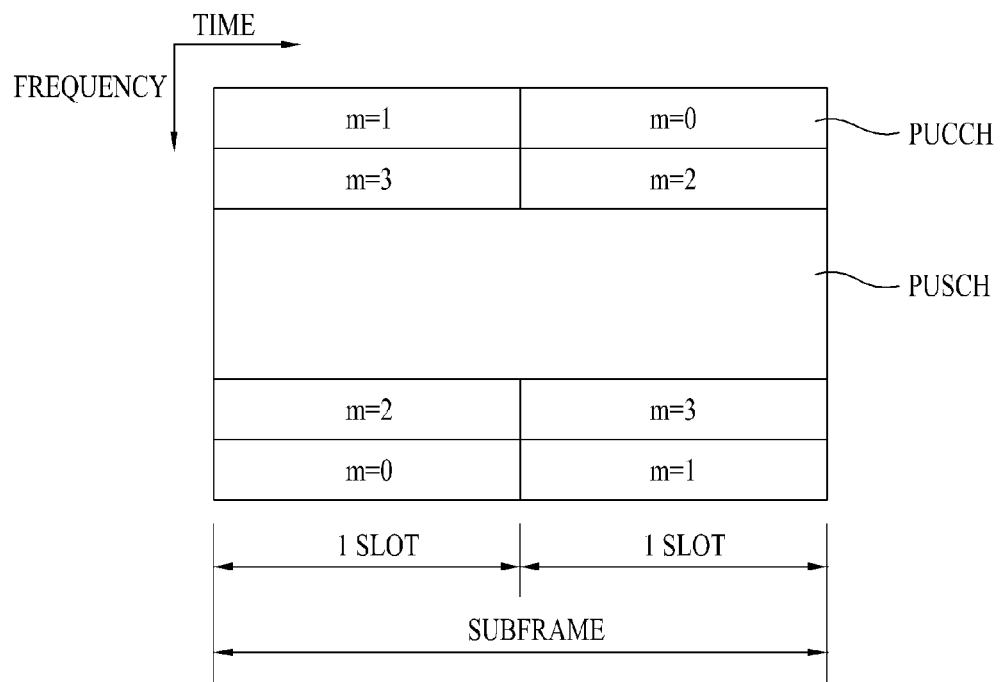
FIG. 4 illustrates an uplink subframe structure.

FIG. 4 illustrates an uplink subframe structure for use in LTE(-A).

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

—Scheduling Request (SR): This is information used to request a UL-SCH resource and is transmitted using On-Off Keying (OOK) scheme.

—HARQ-ACK: This is a response to a downlink data packet (e.g. codeword) on a PDSCH and indicates whether the downlink data packet has been successfully received. A 1-bit HARQ-ACK signal is transmitted as a response to a single downlink codeword and a 2-bit HARQ-ACK signal is transmitted as a response to two downlink codewords. A HARQ-ACK response includes positive ACK (simply, ACK), negative ACK (NACK), DTX (Discontinuous Transmission) or NACK/DTX. Here, the term HARQ-ACK is used interchangeably with the term HARQ ACK/NACK and ACK/NACK.

—Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE(-A).

TABLE 3

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |
| Format 3 (LTE-A) | Up to 24-bit HARQ ACK/NACK + SR |

A description will be given of TDD signal transmission timing in a single carrier (or cell) situation with reference to FIGS. 5 to 11.

Figure 5:
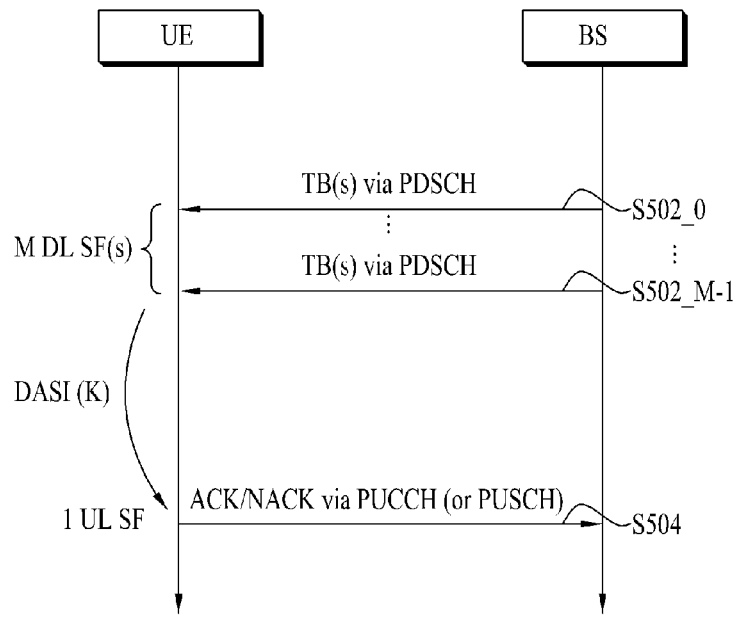
FIGS. 5 and 6 illustrate TDD UL ACK/NACK (Uplink Acknowledgement/Negative Acknowledgement) transmission timing in a single cell situation.
Figure 6:
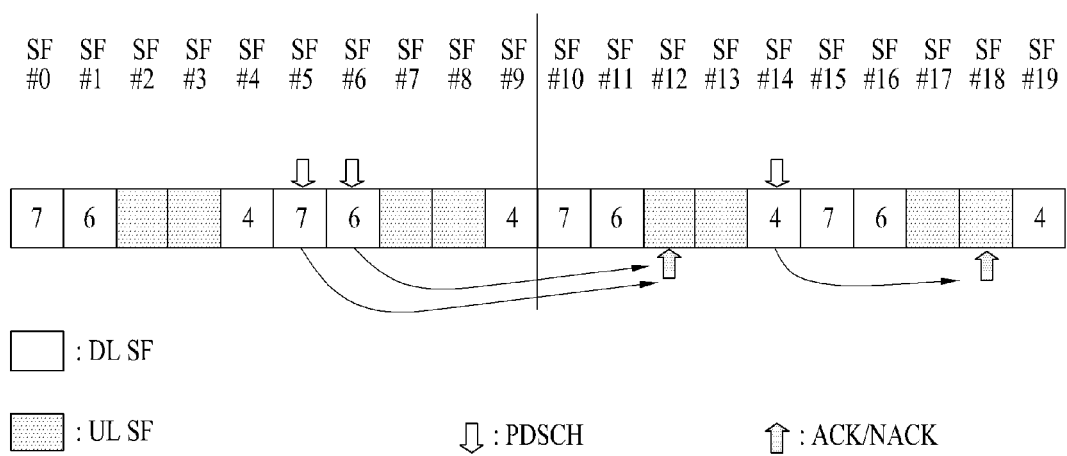

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M-1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M-1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or SPS release PDCCH received in step S502_0 to S502_M-1. While ACK/NACK is transmitted through a PUCCH basically, ACK/NACK is transmitted through a PUSCH when the PUSCH is transmitted at an ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: $\{k_0, k_1, \ldots, k_{M-1}\}$) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In TDD, the UE transmits an ACK/NACK signal for at least one DL transmission signal (e.g. PDSCH) received through M DL SFs through a single UL SF. ACK/NACK for a plurality of DL SFs is transmitted through a single UL SF as follows.

1) ACK/NACK bundling: ACK/NACK bits for a plurality of data units (e.g. PDSCH, SPS release PDCCH, etc.) are combined according to a logical operation (e.g. logic-AND operation). For example, a receiving end (e.g. UE) transmits an ACK signal upon successful decoding of all data units and transmits a NACK signal or no signal upon failure of decoding (or detection) of any one of the data units.

2) Channel selection: A UE receiving a plurality of data units (e.g. PDSCH, SPS release PDCCH, etc.) occupies a plurality of PUCCH resources for ACK/NACK transmission. ACK/NACK responses to the plurality of data units are identified by combinations of PUCCH resources used for ACK/NACK transmission and transmitted ACK/NACK (e.g. bit values and QPSK symbol values). Channel selection is also referred to as ACK/NACK selection and PUCCH selection.

FIG. 6 illustrates UL ACK/NACK transmission timing when UL-DL configuration #1 is set. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 7:
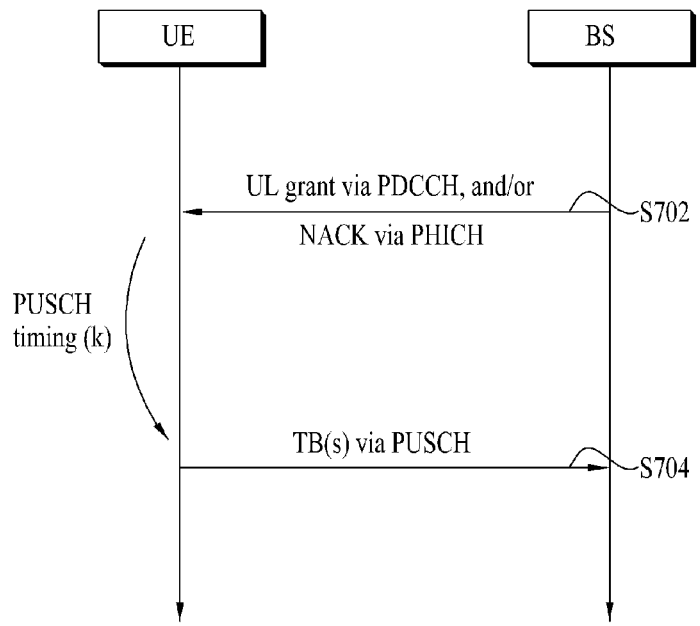
FIGS. 7 and 8 illustrate TDD PUSCH (Physical Uplink Shared Channel) transmission timing in a single cell situation.
Figure 8:
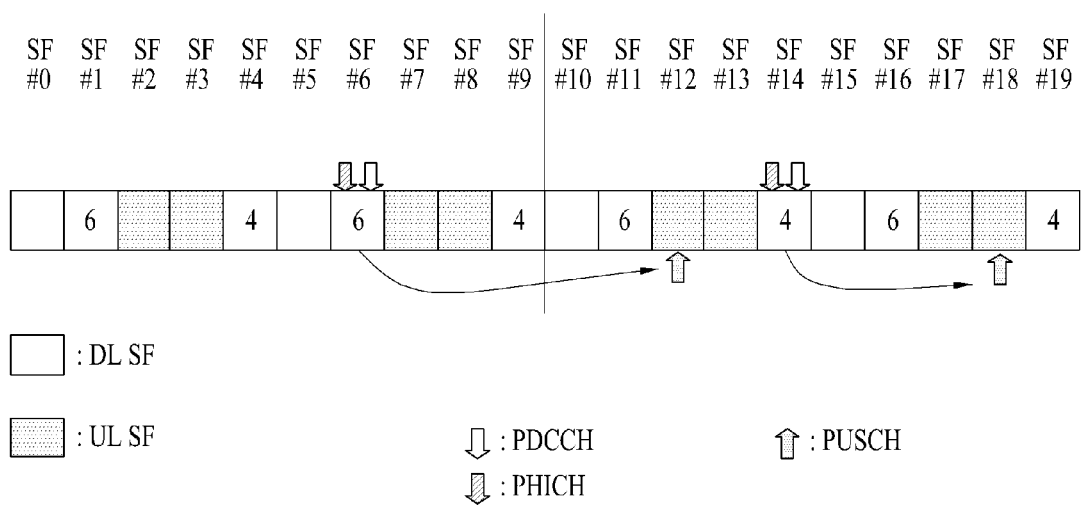

FIGS. 7 and 8 illustrate PHICH/UL grant (UG)-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | 4 | | | 6 | | | 4 |
| 2 | | | 4 | | | | | 4 | | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

FIG. 8 illustrates PUSCH transmission timing when UL-DL configuration #1 is set. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 9:
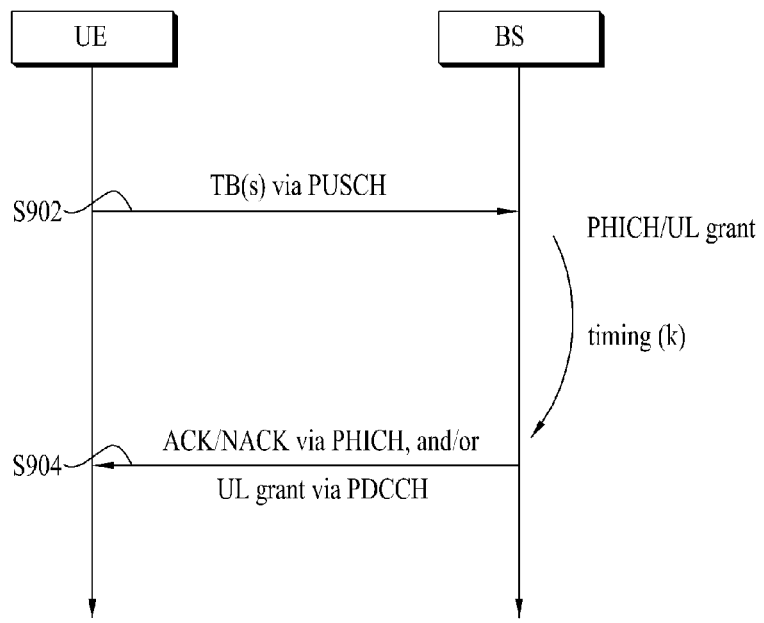
FIGS. 9 and 10 illustrate TDD DL ACK/ANCK transmission timing in a single cell situation.
Figure 10:
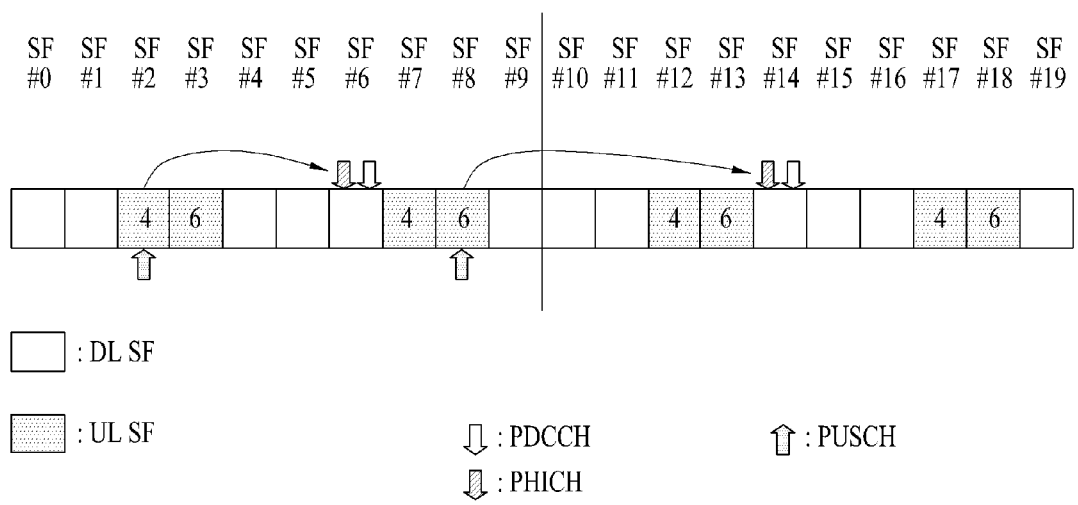

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframes (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i−k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | 6 | | | 4 | | 6 |
| 2 | | | 6 | | | | | 6 | | |
| 3 | 6 | | | | | | | 6 | 6 | |
| 4 | | | | | | | | 6 | 6 | |
| 5 | | | | | | | | 6 | | |
| 6 | 6 | 4 | | | | | 7 | 4 | | 6 |

FIG. 10 illustrates PHICH/UL grant transmission timing when UL-DL configuration #1 is set. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

A description will be given of PHICH resource assignment. When a PUSCH is transmitted in subframe #n, the UE determines a corresponding PHICH resource in subframe #(n+kPHICH). In FDD, kPHICH has a fixed value (e.g. 4). In TDD, $k_{PHICH}$ has a value depending on UL-DL configuration. Table 7 shows $k_{PHICH}$ values for TDD and is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version (RV).

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are set differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the maximum number of DL HARQ processes according to UL-DL configuration in TDD.

TABLE 8

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Table 9 shows the number of synchronous UL HARQ processes and HARQ RTT in TDD. The number of UL SFs is defined per UL-DL cfg and the number of UL HARQ processes and (UL) HARQ RTT are set differently according to UL-DL configuration. HARQ RTT may refer to an interval (in unit of SF or ms) from when a UL grant is received to when a PHICH (corresponding to the UL grant) is received through transmission of a PUSCH (corresponding to the UL grant) or an interval from PUSCH transmission timing to retransmission timing corresponding thereto. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 9

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

A HARQ process is associated with a soft buffer for transport blocks and a soft buffer for code blocks in PHY (Physical) layer. A maximum soft buffer size of a UE is given and a soft buffer size, which can be used by each HARQ process, is determined within the maximum soft buffer size according to the number of HARQ processes.

The HARQ process is used for reliable transport block transmission. A transport block can be divided into one or more code blocks in consideration of an encoder size. In LTE(-A), a code block is coded according to ⅓ TURBO coding and the coded code block includes a system sub-block and two parity sub-block. Each sub-block is permuted through a sub-block interleaver matrix having a size of $K_\pi$. A circular buffer of length $K_w=3K_\pi$ for the r-th coded block is generated as follows.

$$w_k = v^{(0)}_k \text{ for } k=0,\ldots,k_{\Pi-1}$$

$$w_{k\Pi+2k} = v^{(1)}_k \text{ for } k=0,\ldots,k_{\Pi-1}$$

$$w_{k\Pi+2k+1} = v^{(2)}_k \text{ for } k=0,\ldots,k_{\Pi-1} \quad \text{[Equation 1]}$$

$N_{IR}$ bits denote the soft buffer size for the transport block and $N_{cb}$ denotes the soft buffer size for the r-th code block. $N_{cb}$ is obtained as follows, where C is the number of code blocks.

$$N_{cb}=\min[\text{floor}(N_{IR}/C), K_w] \text{ for DL-SCH and PCH transport channels} \quad \text{[Equation 2]}$$

$N_{cb}=K_w$ for UL-SCH and MCH transport channels $N_{IR}$ is represented as follows.

$$N_{IR}=\text{floor}[N_{soft}/\{K_c * K_{MIMO} * \min(M_{DL\_HARQ}, M_{limit})\}] \quad \text{[Equation 3]}$$

Here, $N_{soft}$ is the total number of soft channel bits according to UE capability.

If $N_{soft}=35982720$, $K_C=5$, else if $N_{soft}=3654144$ and the UE is capable of supporting no more than a maximum of two spatial layers for the DL cell, $K_C=2$ else $K_C=1$ End if.

$K_{MIMO}$ is equal to 2 if the UE is configured to receive PDSCH transmissions based on transmission mode 3, 4, 8 or 9, and is equal to 1 otherwise.

$M_{DL\_HARQ}$ is the maximum number of DL HARQ processes.

$M_{limit}$ is 8.

In FDD and TDD, if the UE is configured with more than two serving cells, then for each serving cell, for at least $K_{MIMO}*\min(M_{DL\_HARQ}, M_{limit})$ transport blocks, the UE stores received soft channel bits corresponding to the range of at least $w_k, w_{k+1}, \ldots, w_{mod(k+nSB-1,Ncb)}$ upon decoding failure of a code block of a transport block. Here, $n_{SB}$ is given by Equation 4.

$$n_{SB}=\min[N_{cb}, \text{floor}[N'_{soft}/\{C*N^{DL}_{cells}*K_{MIMO}*\min(M_{DL\_HARQ}, Mlimit)\}]] \quad \text{[Equation 4]}$$

$w_k$, C, $N_{cb}$, $K_{MIMO}$ and $M_{limit}$ are as defined above.

$M_{DL\_HARQ}$ is the maximum number of DL HARQ processes.

$N^{DL}_{cells}$ is the number of configured serving cells.

$N'_{soft}$ is the total number of soft channel bits according to the UE capability.

In determining k, the UE gives priority to storing soft channel bits corresponding to lower values of k. $w_k$ corresponds to a received soft channel bit. The range $w_k, w_{k+1}, \ldots, w_{mod(k+nSB-1,Ncb)}$ may include subsets which do not containing received soft channel bits.

Figure 11:
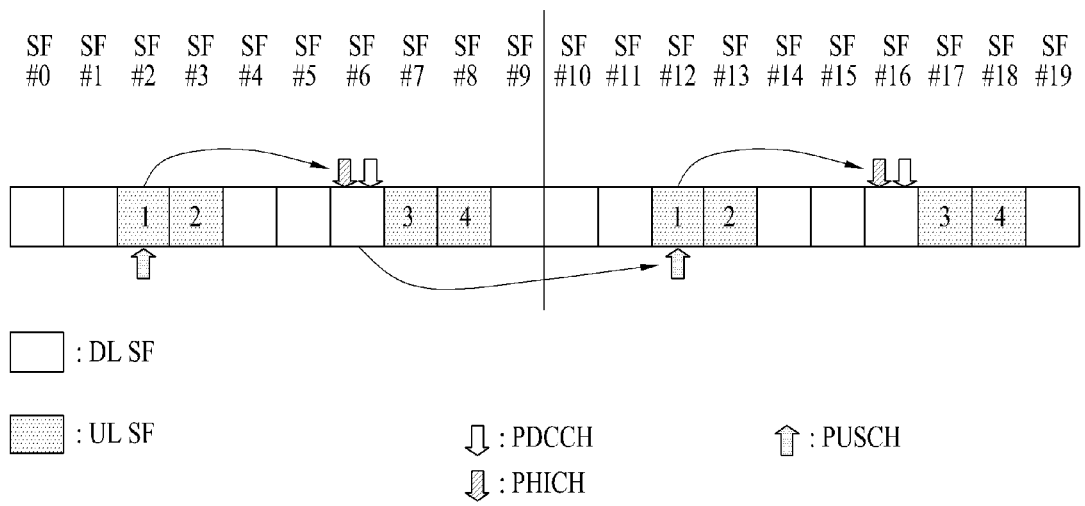
FIG. 11 illustrates a TDD HARQ (Hybrid Automatic Repeat request) process in a single cell situation.

FIG. 11 illustrates a synchronous UL HARQ process when UL-DL configuration #1 is set. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 12:
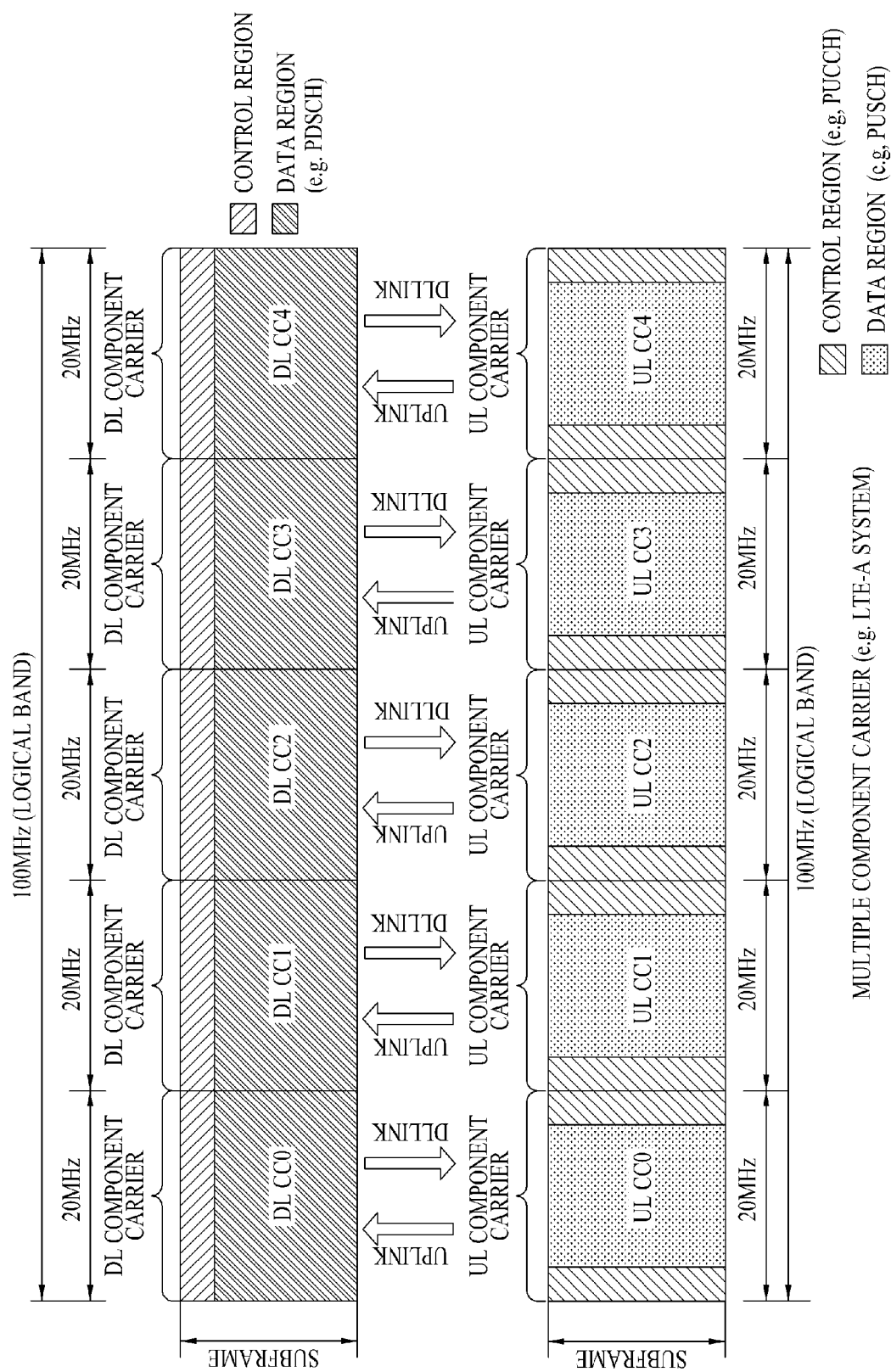
FIG. 12 illustrates a carrier aggregation (CA) communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

Figure 13:
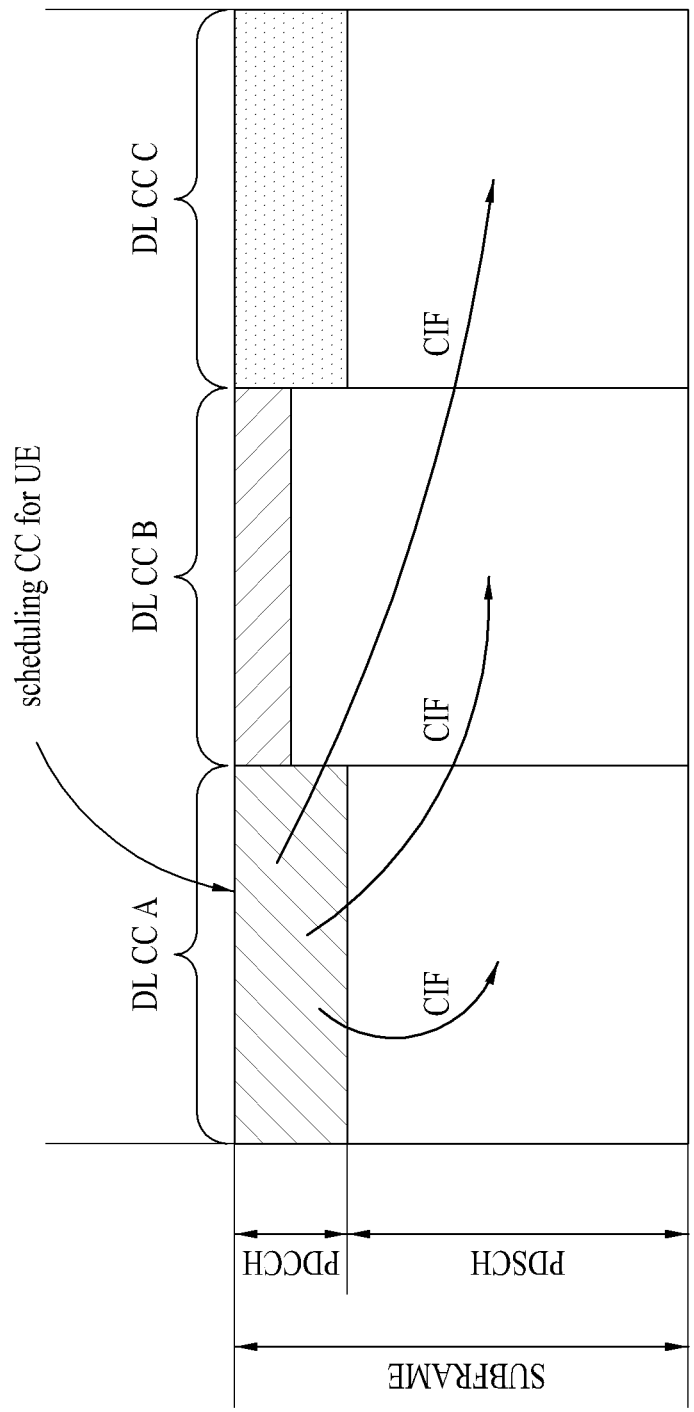
FIG. 13 illustrates scheduling when multiple carriers are aggregated.

FIG. 13 illustrates scheduling when a plurality of carriers is aggregated. It is assumed that 3 DL CCs are aggregated and DL CC A is set to a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC (or MCC) interchangeably. A CC (or cell) in which a PDSCH/PUSCH is scheduled by a PDCCH of another CC is called a scheduled CC (or scheduled cell). One or more scheduling CCs may be set for one UE and one of the scheduling CCs may be used for DL control signaling and UL PUCCH transmission. That is, a scheduling CC includes a PCC. When only one scheduling CC is set, the scheduling CC corresponds to the PCC. The scheduling CC/scheduled CC may also be called MCC/SCC in the following description.

When cross-CC scheduling is set, CCs carrying signals are defined according to signal type as follows.

—PDCCH (UL/DL grant): scheduling CC (or MCC)
—PDSCH/PUSCH: CC indicated by a CIF of a PDCCH, detected from a scheduling CC
—DL ACK/NACK (e.g. PHICH): scheduling CC (or MCC) (e.g. DL PCC)
—UL ACK/NACK (e.g. PUCCH): UL PCC FIG. 14 illustrates a method for transmitting ACK/NACK information using channel selection in a conventional CA TDD system.

Referring to FIG. 14, it is assumed that 2 serving cells (i.e. PCell and SCell or PCC and SCC) having the same TDD UL-DL Cfg are aggregated in the conventional CA TDD system. A channel selection scheme using PUCCH format 1b when $M \leq 2$ in a UL subframe n for HARQ-ACK transmission will first be described. Here, M denotes the number of (i.e. the number of DL SFs corresponding to UL SFs) of elements of set K described above with reference to Table 4. When $M \leq 2$ in the UL subframe n, a UE can transmit b(0)b(1) on a PUCCH resource selected from A PUCCH resources $n^{(1)}_{PUCCH,i}$ ($0 \leq i \leq A-1$ and $A \subset \{2,3,4\}$). Specifically, the UE transmits an A/N signal in the UL subframe n using PUCCH format 1b according to Table 10, 11 and 12. When M=1 in the UL subframe n, HARQ-ACK(j) denotes an A/N response to a TB or an SPS release PDCCH, which is related to a serving cell c. Here, when M=1, a TB, HARQ-ACK(j) and A PUCCH resources can be given according to Table 10. When M=2 in the UL subframe n, HARQ-ACK(j) denotes an A/N response to a TB or an SPS release PDCCH in DL subframe(s) provided by set K in each serving cell. Here, M=2, subframes and A PUCCH resources in each serving cell for HARQ-ACK(j) can be given according to Table 14.

Table 10 is a mapping table for channel selection, defined in LTE-A when 2 CCs having the same UL-DL configuration are aggregated, M=1 and A=2.

TABLE 10

| HARQ-ACK(0), HARQ-ACK(1) | $n_{PUCCH}^{(1)}$ | b(0)b(1) |
| --- | --- | --- |
| ACK, ACK | $n_{PUCCH,1}^{(1)}$ | 1, 0 |
| ACK, NACK/DTX | $n_{PUCCH,0}^{(1)}$ | 1, 1 |
| NACK/DTX, ACK | $n_{PUCCH,1}^{(1)}$ | 0, 1 |
| NACK, NACK/DTX | $n_{PUCCH,0}^{(1)}$ | 0, 0 |
| DTX, NACK/DTX | No Transmission | |

Here, $n^{(1)}_{PUCCH,0}$ can be allocated an implicit PUCCH resource linked to a PDCCH (i.e. PCC-PDCCH) that schedules a PCC (or PCell) and $n^{(1)}_{PUCCH,1}$ can be allocated an implicit PUCCH resource linked to a PDCCH (i.e. SCC-PDCCH) that schedules an SCC or an explicit PUCCH resource reserved through RRC according to whether or not cross-CC scheduling is applied. For example, $n^{(1)}_{PUCCH,0}$ can be allocated an implicit PUCCH resource linked to the PCC-PDCCH and $n^{(1)}_{PUCCH,1}$ can be allocated an implicit PUCCH resource linked to the SCC-PDCCH when cross-CC scheduling is employed.

Table 11 is a mapping table for channel selection, defined in LTE-A when two CCs having the same UL-DL Cfg are aggregated, M=1 and A=3.

TABLE 11

| HARQ-ACK(0), HARQ-ACK(1), HARQ-ACK(2) | $n_{PUCCH}^{(1)}$ | b(0)b(1) |
|---|---|---|
| ACK, ACK, ACK | $n_{PUCCH,2}^{(1)}$ | 1, 1 |
| ACK, ACK, NACK/DTX | $n_{PUCCH,1}^{(1)}$ | 1, 0 |
| ACK, NACK/DTX, ACK | $n_{PUCCH,2}^{(1)}$ | 1, 0 |
| ACK, NACK/DTX, NACK/DTX | $n_{PUCCH,0}^{(1)}$ | 1, 1 |
| NACK/DTX, ACK, ACK | $n_{PUCCH,2}^{(1)}$ | 0, 1 |
| NACK/DTX, ACK, NACK/DTX | $n_{PUCCH,1}^{(1)}$ | 0, 1 |
| NACK/DTX, NACK/DTX, ACK | $n_{PUCCH,2}^{(1)}$ | 0, 0 |
| NACK, NACK/DTX, NACK/DTX | $n_{PUCCH,0}^{(1)}$ | 0, 0 |
| DTX, NACK/DTX, NACK/DTX | No Transmission | |

When a PCC corresponds to a MIMO CC and an SCC corresponds to a non-MIMO CC, $n_{PUCCH,0}^{(1)}$ and $n_{PUCCH,1}^{(1)}$ can be allocated implicit PUCCH resources linked to the PCC-PDCCH and $n_{PUCCH,2}^{(1)}$ can be allocated an implicit PUCCH resource linked to the SCC-PDCCH or an explicit PUCCH resource reserved through RRC according to whether or not cross-CC scheduling is applied. If the PCC corresponds to a non-MIMO CC and the SCC corresponds to a MIMO CC, $n_{PUCCH,0}^{(1)}$ can be allocated an implicit PUCCH resource linked to the PCC-PDCCH and $n_{PUCCH,1}^{(1)}$ and $n_{PUCCH,2}^{(1)}$ can be allocated implicit PUCCH resources linked to the SCC-PDCCH or explicit PUCCH resources reserved through RRC according to whether or not cross-CC scheduling is employed.

Table 12 is a mapping table for channel selection, defined in LTE-A when two CCs having the same UL-DL Cfg are aggregated, M≤2 and A=4.

TABLE 12

| HARQ-ACK(0), HARQ-ACK(1), HARQ-ACK(2), HARQ-ACK(3) | $n_{PUCCH}^{(1)}$ | b(0)b(1) |
|---|---|---|
| ACK, ACK, ACK, ACK | $n_{PUCCH,1}^{(1)}$ | 1, 1 |
| ACK, ACK, ACK, NACK/DTX | $n_{PUCCH,2}^{(1)}$ | 1, 1 |
| ACK, ACK, NACK/DTX, ACK | $n_{PUCCH,0}^{(1)}$ | 1, 0 |
| ACK, ACK, NACK/DTX, NACK/DTX | $n_{PUCCH,1}^{(1)}$ | 1, 0 |
| ACK, NACK/DTX, ACK, ACK | $n_{PUCCH,3}^{(1)}$ | 1, 1 |
| ACK, NACK/DTX, ACK, NACK/DTX | $n_{PUCCH,2}^{(1)}$ | 1, 0 |
| ACK, NACK/DTX, NACK/DTX, ACK | $n_{PUCCH,0}^{(1)}$ | 0, 1 |
| ACK, NACK/DTX, NACK/DTX, NACK/DTX | $n_{PUCCH,0}^{(1)}$ | 1, 1 |
| NACK/DTX, ACK, ACK, ACK | $n_{PUCCH,1}^{(1)}$ | 0, 0 |
| NACK/DTX, ACK, ACK, NACK/DTX | $n_{PUCCH,2}^{(1)}$ | 0, 1 |
| NACK/DTX, ACK, NACK/DTX, ACK | $n_{PUCCH,3}^{(1)}$ | 1, 0 |
| NACK/DTX, ACK, NACK/DTX, NACK/DTX | $n_{PUCCH,1}^{(1)}$ | 0, 1 |
| NACK/DTX, NACK/DTX, ACK, ACK | $n_{PUCCH,3}^{(1)}$ | 0, 1 |
| NACK/DTX, NACK/DTX, ACK, NACK/DTX | $n_{PUCCH,2}^{(1)}$ | 0, 0 |
| NACK/DTX, NACK/DTX, NACK/DTX, ACK | $n_{PUCCH,3}^{(1)}$ | 0, 0 |
| NACK, NACK/DTX, NACK/DTX, NACK/DTX | $n_{PUCCH,0}^{(1)}$ | 0, 0 |
| DTX, NACK/DTX, NACK/DTX, NACK/DTX | No Transmission | |

Implicit PUCCH resources linked to a PDCCH (i.e. PCC-PDCCH) that schedules a PCC (or PCell) can be allocated to $n_{PUCCH,0}^{(1)}$ and/or $n_{PUCCH,1}^{(1)}$ irrespective of cross-CC scheduling and implicit PUCCH resource linked to a PDCCH (i.e. SCC-PDCCH) that schedules an SCC or explicit PUCCH resources reserved through RRC can be allocated to $n_{PUCCH,2}^{(1)}$ and/or $n_{PUCCH,3}^{(1)}$ according to whether or not cross-CC scheduling is applied. For example, when M=2 and cross-CC scheduling is applied, implicit PUCCH resources linked to PCC-PDCCHs of first and second DL SFs can be allocated to $n_{PUCCH,0}^{(1)}$ and $n_{PUCCH,1}^{(1)}$ and implicit PUCCH resources linked to SCC-PDCCHs of the first and second DL SFs can be allocated to $n_{PUCCH,2}^{(1)}$ and $n_{PUCCH,3}^{(1)}$.

Table 13 shows TBs, HARQ-ACK(j) and PUCCH resources when M=1.

TABLE 13

| | | HARQ-ACK(j) | | |
|---|---|---|---|---|
| A | HARQ-ACK(0) | HARQ-ACK(1) | HARQ-ACK(2) | HARQ-ACK(3) |
| 2 | TB1 Primary cell | TB1 Secondary cell | NA | NA |
| 3 | TB1 Primary cell | TB1 Secondary cell | TB2 Secondary cell | NA |
| 3 | TB1 Primary cell | TB2 Primary cell | TB1 Secondary cell | NA |
| 4 | TB1 Primary cell | TB2 Primary cell | TB1 Secondary cell | TB2 Secondary cell |

* TB: transport block, NA: not available

Table 14 illustrates TBs, HARQ-ACK(j) and PUCCH resources when M=2.

TABLE 14

| | | HARQ-ACK(j) | | |
|---|---|---|---|---|
| A | HARQ-ACK(0) | HARQ-ACK(1) | HARQ-ACK(2) | HARQ-ACK(3) |
| 4 | The first subframe of Primary cell | The second subframe of Primary cell | The first subframe of Secondary cell | The second subframe of Secondary cell |

A channel selection scheme using PUCCH format 1b when M>2 in the UL subframe n for HARQ-ACK transmission will now be described first. This channel selection scheme is similar to the channel selection scheme in case of M≤2. Specifically, the UE transmits an A/N signal using PUCCH format 1b in the UL subframe n according to Tables 15 and 16. When M>2 in the UL subframe n, $n_{PUCCH,0}^{(1)}$ and $n_{PUCCH,1}^{(1)}$ are associated with DL transmission (e.g. PDSCH transmission) on the PCell and $n_{PUCCH,2}^{(1)}$ and $n_{PUCCH,3}^{(1)}$ are related to DL transmission (e.g. PDSCH transmission) on the SCell.

HARQ-ACK(i) for an arbitrary cell denotes an A/N response to a PDCCH (PDSCH corresponding thereto) on which DAI-c that schedules the cell is i+1. When a PDSCH w/o PDCCH is present, HARQ-ACK(0) may refer to an A/N response to the PDSCH w/o PDCCH and HARQ-ACK(1) may refer to an A/N response to a PDCCH (PDSCH corresponding thereto) on which DAI-c is i.

Table 15 is a mapping table for channel selection, defined in LTE-A when two CCs having the same UL-DL Cfg are aggregated and M=3.

TABLE 15

| Primary Cell HARQ-ACK(0), HARQ-ACK(1), HARQ-ACK(2) | Secondary Cell HARQ-ACK(0), HARQ-ACK(1), HARQ-ACK(2) | Resource $n_{PUCCH}^{(1)}$ | Constellation b(0), b(1) | RM Code Input Bits o(0), o(1), o(2), o(3) |
|---|---|---|---|---|
| ACK, ACK, ACK | ACK, ACK, ACK | $n_{PUCCH,1}^{(1)}$ | 1, 1 | 1, 1, 1, 1 |
| ACK, ACK, NACK/DTX | ACK, ACK, ACK | $n_{PUCCH,1}^{(1)}$ | 0, 0 | 1, 0, 1, 1 |
| ACK, NACK/DTX, any | ACK, ACK, ACK | $n_{PUCCH,3}^{(1)}$ | 1, 1 | 0, 1, 1, 1 |
| NACK/DTX, any, any | ACK, ACK, ACK | $n_{PUCCH,3}^{(1)}$ | 0, 1 | 0, 0, 1, 1 |
| ACK, ACK, ACK | ACK, ACK, NACK/DTX | $n_{PUCCH,0}^{(1)}$ | 1, 0 | 1, 1, 1, 0 |
| ACK, ACK, NACK/DTX | ACK, ACK, NACK/DTX | $n_{PUCCH,3}^{(1)}$ | 1, 0 | 1, 0, 1, 0 |
| ACK, NACK/DTX, any | ACK, ACK, NACK/DTX | $n_{PUCCH,0}^{(1)}$ | 0, 1 | 0, 1, 1, 0 |
| NACK/DTX, any, any | ACK, ACK, NACK/DTX | $n_{PUCCH,3}^{(1)}$ | 0, 0 | 0, 0, 1, 0 |
| ACK, ACK, ACK | ACK, NACK/DTX, any | $n_{PUCCH,2}^{(1)}$ | 1, 1 | 1, 1, 0, 1 |
| ACK, ACK, NACK/DTX | ACK, NACK/DTX, any | $n_{PUCCH,2}^{(1)}$ | 0, 1 | 1, 0, 0, 1 |
| ACK, NACK/DTX, any | ACK, NACK/DTX, any | $n_{PUCCH,2}^{(1)}$ | 1, 0 | 0, 1, 0, 1 |
| NACK/DTX, any, any | ACK, NACK/DTX, any | $n_{PUCCH,2}^{(1)}$ | 0, 0 | 0, 0, 0, 1 |
| ACK, ACK, ACK | NACK/DTX, any, any | $n_{PUCCH,1}^{(1)}$ | 1, 0 | 1, 1, 0, 0 |
| ACK, ACK, NACK/DTX | NACK/DTX, any, any | $n_{PUCCH,1}^{(1)}$ | 0, 1 | 1, 0, 0, 0 |
| ACK, NACK/DTX, any | NACK/DTX, any, any | $n_{PUCCH,0}^{(1)}$ | 1, 1 | 0, 1, 0, 0 |
| NACK, any, any | NACK/DTX, any, any | $n_{PUCCH,0}^{(1)}$ | 0, 0 | 0, 0, 0, 0 |
| DTX, any, any | NACK/DTX, any, any | No Transmission | | 0, 0, 0, 0 |

Here, implicit PUCCH resources linked to a PDCCH (i.e. PCC-PDCCH) that schedules a PCC (or PCell) can be allocated to $n_{PUCCH,0}^{(1)}$ and/or $n_{PUCCH,1}^{(1)}$ irrespective of cross-CC scheduling and implicit PUCCH resource linked to a PDCCH (i.e. SCC-PDCCH) that schedules an SCC or explicit PUCCH resources reserved through RRC can be allocated to $n_{PUCCH,2}^{(1)}$ and/or $n_{PUCCH,3}^{(1)}$ according to whether or not cross-CC scheduling is applied. For example, implicit PUCCH resources linked to PCC-PDCCHs corresponding to DAI-c of 1 and DAI-c of 2 can be allocated to $n_{PUCCH,0}^{(1)}$ and $n_{PUCCH,1}^{(1)}$, respectively, and implicit PUCCH resources linked to SCC-PDCCHs corresponding to DAI-c of 1 and DAI-c of 2 can be allocated to $n_{PUCCH,2}^{(1)}$ and $n_{PUCCH,3}^{(1)}$, respectively, in a TDD situation.

Table 16 is a mapping table for channel selection, defined in LTE-A when two CCs having the same UL-DL Cfg are aggregated and M=4.

TABLE 16

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, ACK, ACK, NACK/DTX | ACK, ACK, ACK, NACK/DTX | $n_{PUCCH,1}^{(1)}$ | 1, 1 | 1, 1, 1, 1 |
| ACK, ACK, NACK/DTX, any | ACK, ACK, ACK, NACK/DTX | $n_{PUCCH,1}^{(1)}$ | 0, 0 | 1, 0, 1, 1 |
| ACK, DTX, DTX, DTX | ACK, ACK, ACK, NACK/DTX | $n_{PUCCH,3}^{(1)}$ | 1, 1 | 0, 1, 1, 1 |
| ACK, ACK, ACK, ACK | ACK, ACK, ACK NACK/DTX | $n_{PUCCH,3}^{(1)}$ | 1, 1 | 0, 1, 1, 1 |
| NACK/DTX, any, any, any | ACK, ACK, ACK, NACK/DTX | $n_{PUCCH,3}^{(1)}$ | 0, 1 | 0, 0, 1, 1 |
| (ACK, NACK/DTX, any, any), except for (ACK, DTX, DTX, DTX) | ACK, ACK, ACK, NACK/DTX | $n_{PUCCH,3}^{(1)}$ | 0, 1 | 0, 0, 1, 1 |
| ACK, ACK, ACK, NACK/DTX | ACK, ACK, NACK/DTX, any | $n_{PUCCH,0}^{(1)}$ | 1, 0 | 1, 1, 1, 0 |
| ACK, ACK, NACK/DTX, any | ACK, ACK, NACK/DTX, any | $n_{PUCCH,3}^{(1)}$ | 1, 0 | 1, 0, 1, 0 |
| ACK, DTX, DTX, DTX | ACK, ACK, NACK/DTX, any | $n_{PUCCH,0}^{(1)}$ | 0, 1 | 0, 1, 1, 0 |
| ACK, ACK, ACK, ACK | ACK, ACK, NACK/DTX, any | $n_{PUCCH,0}^{(1)}$ | 0, 1 | 0, 1, 1, 0 |
| NACK/DTX, any, any, any | ACK, ACK, NACK/DTX, any | $n_{PUCCH,3}^{(1)}$ | 0, 0 | 0, 0, 1, 0 |
| (ACK, NACK/DTX, any, any), except for (ACK, DTX, DTX, DTX) | ACK, ACK, NACK/DTX, any | $n_{PUCCH,3}^{(1)}$ | 0, 0 | 0, 0, 1, 0 |
| ACK, ACK, ACK, NACK/DTX | ACK, DTX, DTX, DTX | $n_{PUCCH,2}^{(1)}$ | 1, 1 | 1, 1, 0, 1 |
| ACK, ACK, ACK, NACK/DTX | ACK, ACK, ACK, ACK | $n_{PUCCH,2}^{(1)}$ | 1, 1 | 1, 1, 0, 1 |
| ACK, ACK, NACK/DTX, any | ACK, DTX, DTX, DTX | $n_{PUCCH,2}^{(1)}$ | 0, 1 | 1, 0, 0, 1 |
| ACK, ACK, NACK/DTX, any | ACK, ACK, ACK, ACK | $n_{PUCCH,2}^{(1)}$ | 0, 1 | 1, 0, 0, 1 |
| ACK, DTX, DTX, DTX | ACK, DTX, DTX, DTX | $n_{PUCCH,2}^{(1)}$ | 1, 0 | 0, 1, 0, 1 |

TABLE 16-continued

| Primary Cell HARQ-ACK(0), HARQ-ACK(1), HARQ-ACK(2), HARQ-ACK(3) | Secondary Cell HARQ-ACK(0), HARQ-ACK(1), HARQ-ACK(2), HARQ-ACK(3) | Resource $n_{PUCCH}^{(1)}$ | Constellation b(0), b(1) | RM Code Input Bits o(0), o(1), o(2), o(3) |
|---|---|---|---|---|
| ACK, DTX, DTX, DTX | ACK, ACK, ACK, ACK | $n_{PUCCH,2}^{(1)}$ | 1, 0 | 0, 1, 0, 1 |
| ACK, ACK, ACK, ACK | ACK, DTX, DTX, DTX | $n_{PUCCH,2}^{(1)}$ | 1, 0 | 0, 1, 0, 1 |
| ACK, ACK, ACK, ACK | ACK, ACK, ACK, ACK | $n_{PUCCH,2}^{(1)}$ | 1, 0 | 0, 1, 0, 1 |
| NACK/DTX, any, any, any | ACK, DTX, DTX, DTX | $n_{PUCCH,2}^{(1)}$ | 0, 0 | 0, 0, 0, 1 |
| NACK/DTX, any, any, any | ACK, ACK, ACK, ACK | $n_{PUCCH,2}^{(1)}$ | 0, 0 | 0, 0, 0, 1 |
| (ACK, NACK/DTX, any, any), except for (ACK, DTX, DTX, DTX) | ACK, DTX, DTX, DTX | $n_{PUCCH,2}^{(1)}$ | 0, 0 | 0, 0, 0, 1 |
| (ACK, NACK/DTX, any, any), except for (ACK, DTX, DTX, DTX) | ACK, ACK, ACK, ACK | $n_{PUCCH,2}^{(1)}$ | 0, 0 | 0, 0, 0, 1 |
| ACK, ACK, ACK, NACK/DTX | NACK/DTX, any, any, any | $n_{PUCCH,1}^{(1)}$ | 1, 0 | 1, 1, 0, 0 |
| ACK, ACK, ACK, NACK/DTX | (ACK, NACK/DTX, any, any), except for (ACK, DTX, DTX, DTX) | $n_{PUCCH,1}^{(1)}$ | 1, 0 | 1, 1, 0, 0 |
| ACK, ACK, NACK/DTX, any | NACK/DTX, any, any, any | $n_{PUCCH,1}^{(1)}$ | 0, 1 | 1, 0, 0, 0 |
| ACK, ACK, NACK/DTX, any | (ACK, NACK/DTX, any, any), except for (ACK, DTX, DTX, DTX) | $n_{PUCCH,1}^{(1)}$ | 0, 1 | 1, 0, 0, 0 |
| ACK, DTX, DTX, DTX | NACK/DTX, any, any, any | $n_{PUCCH,0}^{(1)}$ | 1, 1 | 0, 1, 0, 0 |
| ACK, DTX, DTX, DTX | (ACK, NACK/DTX, any, any), except for (ACK, DTX, DTX, DTX) | $n_{PUCCH,0}^{(1)}$ | 1, 1 | 0, 1, 0, 0 |
| ACK, ACK, ACK, ACK | NACK/DTX, any, any, any | $n_{PUCCH,0}^{(1)}$ | 1, 1 | 0, 1, 0, 0 |
| ACK, ACK, ACK, ACK | (ACK, NACK/DTX, any, any), except for (ACK, DTX, DTX, DTX) | $n_{PUCCH,0}^{(1)}$ | 1, 1 | 0, 1, 0, 0 |
| NACK, any, any, any | NACK/DTX, any, any, any | $n_{PUCCH,0}^{(1)}$ | 0, 0 | 0, 0, 0, 0 |
| NACK, any, any, any | (ACK, NACK/DTX, any, any), except for (ACK, DTX, DTX, DTX) | $n_{PUCCH,0}^{(1)}$ | 0, 0 | 0, 0, 0, 0 |
| (ACK, NACK/DTX, any, any), except for (ACK, DTX, DTX, DTX) | NACK/DTX, any, any, any | $n_{PUCCH,0}^{(1)}$ | 0, 0 | 0, 0, 0, 0 |
| (ACK, NACK/DTX, any, any), except for (ACK, DTX, DTX, DTX) | (ACK, NACK/DTX, any, any), except for (ACK, DTX, DTX, DTX) | $n_{PUCCH,0}^{(1)}$ | 0, 0 | 0, 0, 0, 0 |
| DTX, any, any, any | NACK/DTX, any, any, any | No Transmission | | 0, 0, 0, 0 |
| DTX, any, any, any | (ACK, NACK/DTX, any, any), except for (ACK, DTX, DTX, DTX) | No Transmission | | 0, 0, 0, 0 |

Here, $n_{PUCCH,0}^{(1)}$, $n_{PUCCH,1}^{(1)}$, $n_{PUCCH,2}^{(1)}$ and $n_{PUCCH,1}^{(1)}$ can be allocated as shown in Table 15.

A description will be given of a method for transmitting ACK/NACK by the UE when the UE is set in PUCCH format-3 mode in TDD CA with reference to FIG. 15.

FIG. 15 illustrates slot level PUCCH format 3. In PUCCH format 3, A/N information is transmitted through joint coding (e.g. Reed-Muller coding, tail-biting convolutional coding, etc.), block spreading and SC-FDMA modulation.

Referring to FIG. 15, a symbol sequence is transmitted over the frequency domain and OCC (orthogonal cover code) based time-domain spreading is applied to the symbol sequence. Control signals of a plurality of UEs can be multiplexed to the same RB using an OCC. Specifically, 5 SC-FDMA symbols (i.e. UCI data parts) are generated from one symbol sequence {d1, d2, . . . ,} using a length-5 OCC (C1 to C5). Here, the symbol sequence {d1, d2, . . . } may be a modulation symbol sequence or a codeword bit sequence.

ACK/NACK payloads for PUCCH format 3 are respectively configured for respective cells and connected in order of cell index. Specifically, HARQ-ACK feedback bits for a c-th serving cell (or DL CC) are $$o_{c,0}^{ACK} o_{c,1}^{ACK}, \ldots, o_{c,O_c^{ACK}-1}^{ACK} (c \geq 0, P = o_c^{ACK}).$$

Here, $o_c^{ACK}$ denotes the number (i.e. size) of HARQ-ACK payload bits for the c-th serving cell. When a transmission mode supporting single TB transmission is set or spatial bundling is applied to the c-th serving cell, $o_c^{ACK}$ can be set as $o_c^{ACK} = B_c^{DL}$. If a transmission mode supporting transmission of a plurality of (e.g. 2) TBs is set and spatial bundling is not applied to the c-th serving cell, $o_c^{ACK}$ can be set as $o_c^{ACK} = 2B_c^{DL}$. When the HARQ-ACK payload bits are transmitted through a PUCCH, or W corresponding to a PUSCH is not present though the HARQ-ACK payload bits are transmitted through the PUSCH (e.g. in case of SPS based PUSCH), $B_c^{DL}$ is set as $B_c^{DL}=M$. Here, M represents the number of elements of set K defined in Table 4. When TDD UL-DL configurations correspond to #1, #2, #3, #4 and #6 and the HARQ-ACK payload bits are transmitted through a PUSCH, $B_c^{DL}=W_{DAI}^{UL}$. Here, $W_{DAI}^{UL}$ denotes a value indicated by a UL DAI field in a UL grant PDCCH and is simply represented as W. In case of TDD UL-DL configuration #5, $B_c^{DL}=W_{DAI}^{UL}+4*\text{ceil}[(U-W_{DAI}^{UL})/4]$. Here, U denotes a maximum value from among Ucs, Uc representing the total number of PDSCH(s) received in a subframe n–k and PDCCHs indicating (downlink) SPS release in the c-th serving cell. A subframe n is a subframe in which HARQ-ACK feedback bits are transmitted and ceil[ ] represents a ceiling function.

When a transmission mode supporting single TB transmission is set or spatial bundling is applied to the c-th serving cell, the position of each ACK/NACK in the HARQ-ACK payload of the c-th serving cell is given as $o_{c,DAI(k)-1}^{ACK}$. Here, DAI(k) represents a DL DAI value of a PDCCH detected from a DL subframe n–k. If a transmission mode supporting transmission of a plurality of (e.g. 2) TBs is set and spatial bundling is not applied to the c-th serving cell, the position of each ACK/NACK in the HARQ-ACK payload of the c-th serving cell is given as $o_{c,2DAI(k)-2}^{ACK}$ and $o_{c,2DAI(k)-1}^{ACK}$. $o_{c,2DAI(k)-2}^{ACK}$ represents HARQ-ACK for codeword 0 and $o_{c,2DAI(k)-1}^{ACK}$ represents HARQ-ACK for codeword 1. Codewords 0 and 1 respectively correspond to TBs 0 and 1 or TBs 1 and 0 according to swiping. When PUCCH format 3 is transmitted through a subframe set for SR transmission, PUCCH format 3 is transmitted with ACK/NACK bits and 1-bit SR.

Embodiment

A/N Transmission when CCs (or Cells) Having Different UL-DL Configurations are Aggregated A beyond LTE-A system may consider aggregation of a plurality of CCs having different subframe configurations (e.g. aggregation of CCs having different TDD DL-UL Cfgs, CA or aggregation of an FDD CC and a TDD CC). In this case, different A/N timings (i.e. UL SF timing at which A/N with respect to DL data transmitted through each DL SF is transmitted) may be set to a PCC and an SCC according to UL-DL configurations of the corresponding CCs. For example, for the same DL SF timing (DL data transmitted at the DL SF timing), UL SF timing at which A/N is transmitted can be set differently for the PCC and the SCC. In addition, a DL SF group for which A/N feedback transmitted at the same UL SF timing is performed can be set differently for the PCC and the SCC. Furthermore, link directions (i.e. DL or UL) of the PCC and the SCC may differ from each other for the same SF timing. For example, the SCC can be set to a UL SF in which A/N is to be transmitted at a specific SF timing, whereas the PCC can be set to a DL SF at the same SF timing. DL SF may include the special SF as well as the normal DL SF in the specification.

In addition, the beyond LTE-A system based on TDD may support cross-CC scheduling in CA based on different TDD UL-DL configurations (referred to as different TDD CA for convenience). In this case, different UL grant timings (DL SF timing at which a UL grant that schedules UL transmission is transmitted) and different PHICH timings (DL SF timing at which a PHICH corresponding to UL data is transmitted) may be set to an MCC (monitoring CC) and an SCC. For example, a DL SF in which a UL grant/PHICH is transmitted can be set differently in an MCC and an SCC for the same UL SF. Furthermore, a UL SF group for which UL grant or PHICH feedback is transmitted in the same DL SF can be set differently for the MCC and the SCC. In this case, link directions of the MCC and the SCC may differ at the same SF timing. For example, specific SF timing can be set to a DL SF in which a UL grant/PHICH will be transmitted in the SCC, whereas the SF timing can be set to a UL SF in the MCC.

When SF timing (referred to as collided SF hereinafter) at which link directions of a PCC (or MCC) and an SCC differ from each other due to different TDD CA configurations is present, only a CC from the PCC/SCC (or MCC/SCC), which has a specific link direction or the same link direction as that of a specific CC (e.g. PCC (or MCC)), can be handled at the SF timing due to hardware configuration of the UE or for other reasons/purposes. This scheme is called HD (Half-Duplex)-TDD CA for convenience. For example, when a collided SF is generated since specific SF timing is set to a DL SF in the case of the MCC and the SF timing is set to a UL SF in the case of the SCC, only the MCC (i.e. DL SF set to the MCC) having DL direction at the SF timing may be handled and the SCC (i.e. UL SF set to the SCC) having UL direction at the SF timing may not be handled (and vice versa). In this situation, to transmit a UL grant/PHICH for UL data, transmitted through the MCC and the UL SF of the SCC cross-scheduled through the MCC, a method of applying UL grant/PHICH timing set in a specific UL-DL configuration per CC or commonly applying the same to the corresponding MCC/SCC may be considered. Here, the specific UL-DL configuration (referred to as a reference configuration (Ref-Cfg)) may correspond to a UL-DL configuration set to the MCC or the SCC or can be determined as a UL-DL configuration other than the UL-DL configuration set to the MCC or the SCC.

In the meantime, a scheme in which simultaneous UL/DL transmission and reception are permitted in a collided SF in which link directions of a PCC (or MCC) and an SCC differ from each other can be considered. This scheme is called FD (Full Duplex)-TDD CA. To transmit a UL grant/PHICH for UL SFs of the MCC and (cross-CC-scheduled) SCC in FD-TDD CA, UL grant/PHICH timing set in a specific Ref-Cfg may be applied per CC or commonly applied to the MCC/SCC. Ref-Cfg may be identical to MCC-Cfg or SCC-Cfg or may be determined as a DL-UL Cfg other than MCC-Cfg and SCC-Cfg.

When the Ref-Cfg based UL grant or PHICH timing allocation scheme is applied, UL grant or PHICH timing set to UD-Cfg having a UL HARQ RTT different from that set to the corresponding SCC may be applied to U of the SCC in a specific MCC/SCC combination. For example, when the MCC corresponds to UD-Cfg #6 and the SCC corresponds to UD-Cfg #1 (having a UL HARQ RTT of 10 [SFs or ms]), Ref-Cfg for SCC U can be set to UD-Cfg #6. In this case, UL grant/PHICH timing having a UL HARQ RTT of non-10 [SFs or ms] can be applied to the SCC having an SF configuration in which an RTT of 10 [SFs or ms] is set. In this case, a problem may be generated in setting of UL HARQ timing. The unit of SF or ms is defined as a TTI (Transmission Time Interval) for convenience.

Here, D refers to a DL SF or a special SF and U refers to a UL SF. When a UL-DL configuration (UD-Cfg) of a CC is (semi-)statically set through broadcast information or higher layer signaling, the subframe configuration of the CC can be determined on the basis of Table 1. In addition, application of ACK/NACK timing set to a specific CC (i.e. Ref-CC) or specific UD-Cfg (i.e. Ref-Cfg) may mean use of a parameter value corresponding to UD-Cfg of the specific CC or the specific UD-Cfg in Table 4. Similarly, application of UL grant or PHICH timing set to a specific CC (i.e. Ref-CC) or specific UD-Cfg (i.e. Ref-Cfg) may mean use of a parameter value corresponding to UD-Cfg of the specific CC or the specific UD-Cfg in Tables 5, 6 and 7. Ref-CC (or Ref-Cfg) for ACK/NACK timing may be referred to as A/N Ref-CC (or A/N Ref-Cfg) or DL Ref-CC (or DL Ref-Cfg) for convenience. Similarly, Ref-CC (or Ref-Cfg) for UL grant or PHICH timing may be referred to as UG/PHICH Ref-CC (or UG/PHICH Ref-Cfg) or UL Ref-CC (or UL Ref-Cfg).

Specifically, Ref-Cfg for a UL HARQ process can be set according to whether cross-CC scheduling is applied as follows.

[UL Union-Based HARQ]

■ UL grant/PHICH with respect to UL data transmitted on an MCC
▶ UL grant/PHICH timing set to the MCC is applied (Ref-Cfg=MCC Cfg).
■ UL grant/PHICH with respect to UL data transmitted on an SCC
▶ Non-cross-CC scheduling: UL grant/PHICH timing set to the SCC is applied (Ref-Cfg=SCC Cfg).
▶ Cross-CC scheduling: UL grant/PHICH timing (referred to as UL union timing hereinafter) of a UD-Cfg (i.e. UL union) having the smallest number of Us from among UL-Cfgs in which SFs having an MCC or SCC corresponding to U are all set to U is applied (Ref-Cfg=UL union SCC Cfg). Equivalently, UL grant/PHICH timing of a UD-Cfg (i.e. UL union) having the largest number of Ds from among UD-Cfgs in which SFs having an MCC or SCC corresponding to U are all set to U is applied.

—In the case of UL union, D/U is set such that UL grant/PHICH timings for all Us of the SCC are set to MCC D. In addition, only UL grant/PHICH timing for U having SF timing corresponding to SCC U in the UL union may be extracted/applied.

FIG. 16 illustrates an example of setting Ref-Cfg according to MCC/SCC combination. When the UL union-based HARQ scheme is applied, Ref-Cfg for an SCC UL HARQ process in the case of cross-CC scheduling can be classified into the following two cases. In FIG. 16, white portions correspond to case 1 and shaded portions correspond case 2.

■ Case 1
▶ When Ref-Cfg has the same UD-Cfg as that of an MCC or an SCC and is set to UD-Cfg having the same UL HARQ RTT as that of the SCC
■ Case 2
▶ When Ref-Cfg is set to UD-Cfg having a UL HARQ RTT different from that of the SCC and/or a third UD-Cfg different from that of the MCC/SCC In case 2, UD-Cfg (e.g. UD-Cfg #0 or #6) having a UL HARQ RTT of non-10 TTI can be set as Ref-Cfg for an SCC (e.g. UD-Cfgs #1 to #5) having a UL HARQ RTT of 10 TTI, for example. In this case, latency required for UL grant-to-PUSCH and/or PUSCH-to-PHUCH may increase compared to UD-Cfg of the SCC and the number of UL HARQ processes may also increase compared to UD-Cfg of the SCC. In addition, in the case of UD-Cfg #0 (UL grant/PHICH timing defined therein), one UL grant PDCCH can simultaneously/selectively schedule a plurality of (e.g. 2) UL SFs and a plurality of PHICH transmission timings corresponding to a plurality of PUSCHs transmitted through the plurality of UL SFs may overlap. Accordingly, when Ref-Cfg is set to UD-Cfg #0 for an SCC which does not correspond to UD-Cfg #0, additional handling for UL grant timing for scheduling a plurality of UL SFs and PHICH timing corresponding thereto may be required.

A description will be given of Ref-Cfg for an SCC UL HARQ process in case of cross-CC scheduling based on TDD CA of different UD-Cfgs and a method of setting UL grant/PHICH timing according to the Ref-Cfg. Specifically, Ref-Cfg for case 1 in FIG. 16 may be determined by applying the UL union-based HARQ scheme. The present invention provides Ref-Cfg for case 2 of FIG. 16 and a method of setting UL grant/PHICH timing according to the Ref-Cfg. As described above, case 2 corresponds to a case in which Ref-Cfg with respect to SCC UL HARQ is set to UD-Cfg having a UL HARQ RTT different from that of the corresponding SCC and/or a third UD-Cfg different from that of the corresponding MCC/SCC when the UL union-based HARQ scheme is applied. Methods proposed by the present invention can be applied to both FD-TDD and HD-TDD irrespective of TDD CA structure unless otherwise mentioned.

Basic principle of the proposed methods is 1) to exclude UD-Cfg #0 from Ref-Cfg, 2) to minimize UL SF loss caused by Ref-Cfg if possible and 3) to determine UD-Cfg having the same UL HARQ RTT as that of the SCC as Ref-Cfg of the SCC if possible.

FIG. 17 illustrates an example of setting Ref-Cfg of an SCC according to the present invention. While FIG. 17 illustrates all cases with respect to case 2, the present invention may be applied only to some combinations in shaded portions (e.g. a combination of MCC #0/SCC #6).

Referring to FIG. 17, numerals indicate UD-Cfg numbers corresponding to Ref-Cfg of the SCC, determined based on the proposed methods according to MCC/SCC combination. A UL SF skipping method described below may be applied to case 2-1 and a DL SF skipping method described below may be applied to case 2-2. Both the UL SF skipping method and the DL SF skipping method may be applied to case 2-3. In FIG. 17, a numeral in [ ] indicates the number of UL SFs of the SCC, which are lost when the proposed Ref-Cfg and UL/DL SF skipping methods are applied, (i.e. the number of UL SFs that are not used for UL data transmission based on a HARQ process).

<UL SF Skipping Method>

It is assumed that UL HARQ timing (UL grant/PUSCH/PHICH timing relationship for UL HARQ process) defined in Ref-Cfg is as in the following.

■ HARQ Timing Originally Defined in Ref-Cfg

Reception of a UL grant (scheduling U0 PUSCH) in D0=>transmission of the PUSCH in U0=>reception of a PHICH (with respect to U0 PUSCH)/UL grant (scheduling U1 PUSCH) in D1=>transmission of the PUSCH in U1=>reception of a PHICH (with respect to U1 PUSCH)/UL grant (scheduling U2 PUSCH) in D2=>transmission of the PUSCH in U2

Here, when the SCC is set to a UL SF at SF timings of U0 and U2 whereas the SCC is not set to a UL SF at SF timing of U1, the present invention resets the UL HARQ timing relationship as follows.

■ Method of Resetting HARQ Timing of the Proposed Ref-Cfg (Opt 1-1)

Reception of a UL grant (scheduling U0 PUSCH) in D0=>transmission of the PUSCH in U0=>reception of a PHICH (with respect to U0 PUSCH) in D1=>reception of a UL grant (scheduling U2 PUSCH) in D2=>transmission of the PUSCH in U2

Opt 1-1 may be considered to skip U1 PUSCH transmission and operation (e.g. D1/D2 UL grant/PHICH reception) associated therewith at the HARQ timing originally defined in Ref-Cfg and reconfigure the timing as in the following:
—retransmitting U0 PUSCH in U2; and —connecting D1, which is PHICH timing for U0 PUSCH transmission, to D2, which is UL grant timing for scheduling U2 PUSCH.

Here, to consecutively arrange SF timings at the reset HARQ timing, D2 can be set to DL (D2) SF timing which includes D1/is closest to D1 while following D1 (which is valid at Ref-Cfg timing). Furthermore, multiple SFs (e.g. U1-1 and U1-2), which are not UL SFs in the SCC while corresponding to HARQ timing of Ref-Cfg, such as U1, may be present between SFs, which are UL SFs in the SCC while corresponding to HARQ timing of Ref-Cfg, such as U0 and U2. In this case, PUSCH transmission and operations associated therewith (e.g. reception of a UL grant scheduling U1-1/U1-2 PHICH/PHICH corresponding to the UL grant) in the multiple SFs can be skipped.

Alternatively, U1 PUSCH transmission and D1 PHICH/UL grant reception associated therewith can be skipped at HARQ timing originally defined in Ref-Cfg and PHICH timing for U0 PUSCH transmission can be changed to D2 (which is PHICH timing for U1 PUSCH) (Opt 1-2). Alternatively, D2 PHICH/UL grant reception can be skipped and UL grant timing for scheduling U2 PUSCH transmission can be changed to D1 (which is UL grant timing for scheduling U1 PUSCH) (Opt 1-3).

Specifically, HARQ timing examples according to Opt 1-2 and Opt 1-3 are as follows.

■Method of Resetting HARQ Timing of the Proposed Ref-Cfg (Opt 1-2)

Reception of the UL grant (scheduling U0 PUSCH) in D1=>transmission of the PUSCH in U0=>reception of the PHICH (with respect to U0 PUSCH)/UL grant (scheduling U2 PUSCH) in D2=>transmission of the PUSCH in U2

■Method Resetting HARQ Timing of the Proposed Ref-Cfg (Opt 1-3)

Reception of the UL grant (scheduling U0 PUSCH) in D0=>transmission of the PUSCH in U0=>reception of the PHICH (with respect to U0 PUSCH)/UL grant (scheduling U2 PUSCH) in D1=>transmission of the PUSCH in U2

Here, to consecutively arrange SF timings at the reset HARQ timing, U1 (having PHICH timing set to D2) can correspond to UL (U1) SF timing closest to U0 (valid at Ref-Cfg timing), which includes/follows U0 (Opt 1-2). Furthermore, U2 can be set to UL (U2) SF timing which includes U1 (having UL grant timing set to D1)/is closest to U1 while following U1 (which is valid at Ref-Cfg timing) (Opt 1-3). In addition, multiple SFs (e.g. U1-1 and U1-2), which are not UL SFs in the SCC while corresponding to HARQ timing of Ref-Cfg, such as U1, may be present between SFs, which are UL SFs in the SCC while corresponding to HARQ timing of Ref-Cfg, such as U0 and U2. In this case, PUSCH transmission and operations associated therewith (UL grant/PHICH reception at UL grant timing for scheduling U1-1/U1-2 PUSCH in the case of Opt 1-2; PHICH/UL grant reception at PHICH timing corresponding to U1-1/U1-2 PUSCH in the case of Opt 1-3) in the multiple SFs can be skipped.

<DL SF Skipping Method>

It is assumed that UL HARQ timing (UL grant/PUSCH/PHICH timing relationship for UL HARQ process) is defined in Ref-Cfg as follows.

■HARQ Timing Originally Defined in Ref-Cfg

Reception of a UL grant (scheduling U0 PUSCH) in D0=>transmission of the PUSCH in U0=>reception of a PHICH (with respect to U0 PUSCH)/UL grant (scheduling U1 PUSCH) in D1=>transmission of the PUSCH in U1=>reception of a PHICH (with respect to U1 PUSCH)/UL grant (scheduling U2 PUSCH) in D2=>transmission of the PUSCH in U2

Here, when an MCC is set to a DL SF at SF timings of D0 and D2 whereas the MCC is not set to a DL SF at SF timing of D1, the present invention resets the UL HARQ timing relationship as in the following.

■Method of Resetting HARQ Timing of the Proposed Ref-Cfg (Opt 2-1)

Reception of the UL grant (scheduling U0 PUSCH) in D0=>transmission of the PUSCH in U0=>reception of the PHICH (with respect to U0 PUSCH)/UL grant (scheduling U2 PUSCH) in D2=>transmission of the PUSCH in U2

Opt 2-1 may be considered to skip D1 PHICH/UL grant reception and operations associated therewith (e.g. U1 PUSCH transmission) at the HARQ timing originally defined in Ref-Cfg and reset the timing as in the following.

—PHICH timing for U0 PUSCH transmission is changed to D2 (which was PHICH timing for U1 PUSCH).

Here, to consecutively arrange SF timings at the reconfigured HARQ timing, U1 (having PHICH timing set to D1) can be set to UL (U1) SF timing which includes U0/is closest to U0 while following U0 (which is valid at Ref-Cfg timing). Furthermore, multiple SFs (e.g. D1-1 and D1-2), which are not DL SFs in the MCC while corresponding to HARQ timing of Ref-Cfg, such as D1, may be present between SFs, which are DL SFs in the MCC while corresponding to HARQ timing of Ref-Cfg, such as D0 and D2. In this case, PHICH/UL grant reception and operations associated therewith (e.g. transmission of a UL SF PUSCH corresponding to D1-1/D1-2 PHICH/UL grant) in the multiple SFs can be skipped.

Alternatively, D1 PHICH/UL grant reception and U0 PUSCH transmission associated therewith can be skipped at the HARQ timing originally defined in Ref-Cfg and UL grant timing for scheduling U1 PUSCH can be changed to D0 (corresponding to UL grant timing for scheduling U0 PUSCH) (Opt 2-2). A HARQ timing example is as follows.

■Method of Resetting HARQ Timing of the Proposed Ref-Cfg (Opt 2-2)

Reception of a UL grant (scheduling U1 PUSCH) in D0=>transmission of the PUSCH in U1=>reception of a PHICH (with respect to U1 PUSCH)/UL grant (scheduling U2 PUSCH) in D2=>transmission of the PUSCH in U2

Here, to consecutively arrange SF timings at the reconfigured HARQ timing, U1 can be set to UL (U1) SF timing which includes U0 (having UL grant timing corresponding to D0)/is closest to U0 while following U0 (which is valid at Ref-Cfg timing). In addition, multiple SFs (e.g. D1-1 and D1-2), which are not DL SFs in the MCC while corresponding to HARQ timing of Ref-Cfg, such as D1, may be present between SFs, which are DL SFs in the MCC while corresponding to HARQ timing of Ref-Cfg, such as D0 and D2. In this case, PHICH/UL grant reception and operations associated therewith (e.g. PUSCH transmission in a UL SF in which D1-1/D1-2 are set to PHICH timing) in the multiple SFs can be skipped.

<Simultaneous Application of UL/DL SF Skipping Methods>

The proposed methods are described on the assumption that UL grant/PUSCH/PHICH timing relationship (in an arbitrary HARQ process) is defined in Ref-Cfg for UL HARQ process as follows.

■HARQ Timing Originally Defined in Ref-Cfg

Reception of a UL grant (scheduling U0 PUSCH) in D0=>transmission of the PUSCH in U0=>reception of a PHICH (with respect to U0 PUSCH)/UL grant (scheduling U1 PUSCH) in D1=>transmission of the PUSCH in U1=>reception of a PHICH (with respect to U1 PUSCH)/UL grant (scheduling U2 PUSCH) in D2=>U2 PUSCH transmission=>reception of a PHICH (with respect to U2

PUSCH)/UL grant (scheduling U3 PUSCH) in D3=>transmission of the PUSCH in U3

Here, the MCC may be set to a DL SF at SF timings of D0, D2 and D3 whereas the MCC may not be set to a DL SF at SF timing of D1. In addition, the SCC may be set to a UL SF at SF timings of U0, U1 and U3 whereas the SCC may not be set to a UL SF at SF timing of U2. Similarly, the SCC may be set to a UL SF at SF timings of U0 and U3 whereas the SCC may not be set to a UL SF at SF timings of U1 and U2.

In this situation, the present invention proposes methods of resetting a UL HARQ timing relationship as follows. The present invention can provide the following six schemes according to combinations of the three UL SF skipping method options (Opt 1-1, Opt 1-2 and Opt 1-3) and the two DL SF skipping method options (Opt 2-1 and Opt 2-2).

■Resetting of HARQ Timing of the Proposed Ref-Cfg (Opt 3-1: Opt 1-1 & Opt 2-1)

Reception of a UL grant (scheduling U0 PUSCH) in D0=>transmission of the PUSCH in U0=>PHICH (with respect to U0 PUSCH) in D2=>reception of a UL grant (scheduling U3 PUSCH) in D3=>transmission of the PUSCH in U3

■Resetting HARQ Timing of the Proposed Ref-Cfg (Opt 3-2: Opt 1-1 & Opt 2-2)

Reception of a UL grant (scheduling U1 PUSCH) in D0=>transmission of the PUSCH in U1=>PHICH (with respect to U1 PUSCH) in D2=>reception of a UL grant (scheduling U3 PUSCH) in D3=>transmission of the PUSCH in U3

■Resetting HARQ Timing of the Proposed Ref-Cfg (Opt 3-3: Opt 1-2 & Opt 2-1)

Reception of a UL grant (scheduling U0 PUSCH) in D0=>transmission of the PUSCH in U0=>reception of a PHICH (with respect to U0 PUSCH)/UL grant (scheduling U3 PUSCH) in D3=>transmission of the PUSCH in U3

■Resetting HARQ Timing of the Proposed Ref-Cfg (Opt 3-4: Opt 1-2 & Opt 2-2)

Reception of a UL grant (scheduling U1 PUSCH) in D0=>transmission of the PUSCH in U1=>reception of a PHICH (with respect to U1 PUSCH)/UL grant (scheduling U3 PUSCH) in D3=>transmission of the PUSCH in U3

■Resetting HARQ Timing of the Proposed Ref-Cfg (Opt 3-5: Opt 1-3 & Opt 2-1)

Reception of a UL grant (scheduling U0 PUSCH) in D0=>transmission of the PUSCH in U0=>reception of a PHICH (with respect to U0 PUSCH)/UL grant (scheduling U3 PUSCH) in D3=>transmission of the PUSCH in U3

■Resetting HARQ Timing of the Proposed Ref-Cfg (Opt 3-6: Opt 1-3 & Opt 2-2)

Reception of a UL grant (scheduling U1 PUSCH) in D0=>transmission of the PUSCH in U1=>reception of a PHICH (with respect to U1 PUSCH)/UL grant (scheduling U3 PUSCH) in D2=>transmission of the PUSCH in U3

SF timings belonging to the reset HARQ timing can be consecutively arranged according to the aforementioned methods in consideration of UL SFs in which PUSCH transmission is skipped and DL SFs in which PHICH/UL grant reception is skipped in UL/DL SF skipping methods. In addition, multiple SFs, which are not UL SFs in the SCC while corresponding to the HARQ timing of Ref-Cfg, (and/or multiple SFs which are not DL SFs in the MCC while corresponding to the HARQ timing of Ref-Cfg) may be present between SFs which are UL SFs in the SCC while corresponding to the HARQ timing of Ref-Cfg. In this case, a principle similar to the proposed schemes in the UL/DL SF skipping methods can be applied.

Specific PHICH timing for PUSCH transmission in the SCC, which is determined using the aforementioned proposed methods, may be set to SF timing (i.e. non-PHICH-DL) which does not correspond to a DL SF defined in UD-Cfg of the MCC as PHICH/UL grant timing. Here, the present invention provides a method of permitting only UL grant reception based adaptive retransmission for PUSCH transmission in a UL SF (or all UL SFs of the SCC including the corresponding UL SF) having PHICH timing set to non-PHICH-DL, without reference to PHICH. That is, PHICH reception may be skipped in non-PHICH-DL and thus PHICH reference based non-adaptive retransmission may not be permitted.

FIG. 18 illustrates an example of setting Ref-Cfg of an SCC according to the present invention. While FIG. 18 shows all cases with respect to case 2, the present invention may be applied to only some combinations in shaded portions (e.g. MCC #0/SCC #6).

Referring to FIG. 18, a UD-Cfg number corresponding to Ref-Cfg of the SCC, determined based on a proposed method according to MCC/SCC combination, is indicated without parentheses and the number of UL HARQ processes allocated according to Ref-Cfg is indicated in parentheses. Here, a numeral in brackets indicates the number of UL SFs of the SCC, which are lost when the proposed methods are applied (i.e. which are not used for HARQ process based UL data transmission) (referred to as Lu hereinafter). Absence of brackets means that there is no lost SCC UL SF. The proposed UL HARQ process allocation methods can be summarized as the following four cases.

■White Portions
▶ A number (Ns) of UL HARQ processes defined in UD-Cfg of the SCC is allocated.
■When Ref-Cfg is not UD-Cfg #6 in Shaded Portions
▶ Ns UL HARQ processes are allocated.
■When Ref-Cfg is UD-Cfg #6 and Lu is 0 in Shaded Portions
▶ (Ns+1) UL HARQ processes are allocated
■When Ref-Cfg is UD-Cfg #6 and Lu is not 0 in Shaded Portions
▶ (Ns+1−Lu) UL HARQ processes are allocated In the case of an MCC/SCC combination (i.e. MCC=UD-Cfg #0, SCC=UD-Cfg #3 or #6) in which a lost SCC UL SF is present in FIG. 17, SCC Ref-Cfg may be set to UD-Cfg #0 in order to prevent SCC UL SF loss. In the case of an MCC/SCC combination (i.e. MCC=UD-Cfg #0, SCC=UD-Cfg #3 or #4) corresponding to case 2-3 to which all proposed DL/UL skipping methods are applied in FIG. 17, SCC Ref-Cfg may be set to UD-Cfg #0 or UD-Cfg #1 in order to reduce complexity and/or UL grant/PUSCH/PHICH transmission delay when UL HARQ related timing is set. In addition, in the case of an MCC/SCC combination (i.e. MCC=UD-Cfg #0, SCC=UD-Cfg #1, #3, #4 or #6) corresponding to case 2-2 to which the proposed DL/UL skipping methods are applied, SCC Ref-Cfg may be set to UD-Cfg #0 or UD-Cfg #1 in order to reduce complexity when UL HARQ related timing is set. Furthermore, in the case of an MCC/SCC combination (i.e. MCC=UD-Cfg #0 or #6) in which the MCC has a UL HARQ RTT corresponding to non-10 TTI in FIG. 17, SCC Ref-Cfg may be set to UD-Cfg #6 in order to lessen scheduling/feedback load of an eNB, which may be caused by application of UL HARQ RTT of 10 TTI having relatively small UL HARQ related latency.

In the aforementioned cases, it is possible to determine whether a proposed DL/UL skipping method is applied, the number of allocated UL HARQ processes and the number of lost SCC UL SFs through methods similar to the methods illustrated in FIGS. 17 and 18 according to a DL/UL SF configuration set in MCC/SCC and Ref-Cfg and a UL grant/ PUSCH/PHICH timing relationship.

Application of the above-described DL/UL skipping methods is not limited to the UL union based or Ref-Cfg based HARQ scheme and the DL/UL skipping methods can be applied to cases similar to the aforementioned cases (e.g. when an MCC is not set to a DL SF at specific (UL grant/ PHICH) DL SF timing on Ref-Cfg and/or when an SCC is not set to a UL SF at specific (PUSCH) UL SF timing on Ref-Cfg) when HARQ operation is performed on the basis of an arbitrary Ref-Cfg.

FIG. 19 illustrates a UL HARQ process according to the present invention. While the figure shows operations of a UE, corresponding operations can be performed by an eNB.

Referring to FIG. 19, the UE aggregates a plurality of CCs (S1902). Here, the CCs may have different subframe configurations (e.g. aggregation of CCs having different TDD UL-DL configurations or aggregation of a TDD CC and an FDD CC). Then, the UE may perform PUSCH transmission, UL grant (UG) reception and PHICH reception for the corresponding CCs according to UG/PHICH timing of Ref-Cfg (S1904). Specifically, UG/PHICH timing set to an MCC is applied as UG/PHICH timing for UL data transmitted on the MCC (i.e. Ref-Cfg=MCC Cfg). UG/PHICH timing for UL data transmitted on an SCC depends on whether cross-CC scheduling is applied. Specifically, UG/PHICH timing set to the SCC is applied as the UG/PHICH timing for UL data transmitted on the SCC (i.e. Ref-Cfg=SCC Cfg) in the case of non-cross-CC scheduling. In the case of cross-CC scheduling, the UG/PHICH timing for UL data transmitted on the SCC is determined according to the UL union-based or Ref-Cfg-based HARQ scheme (Ref-Cfg=UL union Cfg or Ref-Cfg) and a UL/DL skipping method (Opt 1-1 to Opt 3-6) may be applied according to MCC/SCC combination.

Figure 20:
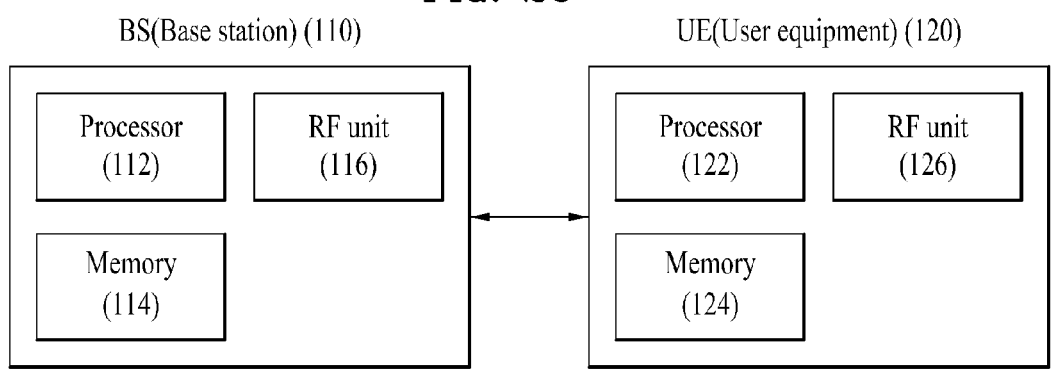
FIG. 20 illustrates a BS and a UE applicable to an embodiment of the present invention.

FIG. 20 illustrates a BS and a UE to which the present invention is applicable. When a wireless communication system includes a relay, backhaul link communication is performed between the BS and the relay and access link communication is carried out between the relay and the UE. Accordingly, the BS or UE illustrated in FIG. 20 can be replaced by the relay.

Referring to FIG. 20, the wireless communication system includes the BS 110 and the UE 120. The BS 110 may include a processor 112, a memory 114 and a radio frequency (RF) unit 116. The processor 112 may be configured to implement procedures and/or methods proposed by the present invention. The memory 114 may be connected to the processor 112 and store information related to operations of the processor 112. The RF unit 116 may be connected to the processor 112 and transmit and/or receive RF signals. The UE 120 may include a processor 122, a memory 124 and an RF unit 126. The processor 122 may be configured to implement procedures and/or methods proposed by the present invention. The memory 124 may be connected to the processor 122 and store information related to operations of the processor 122. The RF unit 126 may be connected to the processor 122 and transmit and/or receive RF signals. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

A specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term, fixed station, Node B, eNode B (eNB), access point, etc. The term terminal may be replaced with the terms UE, MS, Mobile Subscriber Station (MSS), etc.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein

INDUSTRIAL APPLICABILITY

The present invention can be used for radio communication apparatuses such as a UE, a relay, an eNB, etc.

The invention claimed is:

1. A method for performing a hybrid automatic repeat request (HARQ) process by a UE for which a scheduling cell having a first uplink-downlink (UL-DL) configuration and a scheduled cell having a second TDD UL-DL configuration are configured in a wireless communication system, the method comprising:
receiving a UL grant through the scheduling cell;
transmitting, through the scheduled cell, data corresponding to the UL grant according to HARQ timing of a specific UL-DL configuration; and
receiving, through the scheduling cell, acknowledgement information for the data according to the HARQ timing of the specific UL-DL configuration,
wherein the HARQ timing of the specific UL-DL configuration includes UL grant reception in a first DL subframe (DL SF) followed by data transmission in a first UL SF followed by acknowledgement information or UL grant reception in a second DL SF followed by data transmission in a second UL SF followed by acknowledgement information/UL grant reception in a third DL SF followed by data transmission in a third UL SF, wherein, when the scheduling cell is not a DL SF at the timing of the second DL SF, the HARQ timing of the specific UL-DL configuration is reset to include UL grant reception in the first DL SF followed by data transmission in the first UL SF followed by acknowledgement information/UL grant reception in the third DL SF followed by data transmission in the third UL SF.

2. The method according to claim 1, wherein, when the scheduling cell is not a DL SF at the timing of the second DL SF, the second UL SF is reset to UL SF timing closest to the first UL SF, including the first UL SF, in the specific DL-UL configuration, the UL SF timing following the first UL SF.

3. The method according to claim 1, wherein, when the scheduled cell is not a UL SF at the timing of the second UL SF, the HARQ timing of the specific UL-DL configuration is reset to include UL grant reception in the first DL SF followed by UL data transmission in the first UL SF followed by acknowledgement information reception in the second DL SF followed by UL grant reception in the third DL SF followed by data transmission in the third UL SF.

4. The method according to claim 3, wherein, when the scheduled cell is not a UL SF at the timing of the second UL SF, the third DL SF is reset to DL SF timing closest to the second DL SF, including the second DL SF, in the specific UL-DL configuration, the DL SF timing following the second DL SF.

5. The method according to claim 1, wherein subframe configurations according to the UL-DL configuration are defined as follows,

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, S denotes a special subframe and U denotes an uplink subframe.

6. The method according to claim 1, wherein the specific UL-DL configuration is a UL-DL configuration having a smallest number of Us from among UL-DL configurations in which SFs, in which the scheduling cell or the scheduled cell corresponds to U, are all set to U.

7. A UE, for which a scheduling cell having a first uplink-downlink (UL-DL) configuration and a scheduled cell having a second TDD UL-DL configuration are configured, which is configured to perform a HARQ process, comprising:
 a radio frequency (RF) unit; and
 a processor,
 wherein the processor is configured to receive a UL grant through the scheduling cell, to transmit, through the scheduled cell, data corresponding to the UL grant according to HARQ timing of a specific UL-DL configuration and to receive, through the scheduling cell, acknowledgement information for the data according to the HARQ timing of the specific UL-DL configuration, wherein the HARQ timing of the specific UL-DL configuration includes UL grant reception in a first DL subframe (DL SF) followed by data transmission in a first UL SF followed by acknowledgement information or UL grant reception in a second DL SF followed by data transmission in a second UL SF followed by acknowledgement information/UL grant reception in a third DL SF followed by data transmission in a third UL SF, wherein, when the scheduling cell is not a DL SF at the timing of the second DL SF, the HARQ timing of the specific UL-DL configuration is reset to include UL grant reception in the first DL SF followed by data transmission in the first UL SF followed by acknowledgement information/UL grant reception in the third DL SF followed by data transmission in the third UL SF.

8. The UE according to claim 7, wherein, when the scheduling cell is not a DL SF at the timing of the second DL SF, the second UL SF is reset to UL SF timing closest to the first UL SF, including the first UL SF, in the specific DL-UL configuration, the UL SF timing following the first UL SF.

9. The UE according to claim 7, wherein, when the scheduled cell is not a UL SF at the timing of the second UL SF, the HARQ timing of the specific UL-DL configuration is reset to include UL grant reception in the first DL SF followed by UL data transmission in the first UL SF followed by acknowledgement information reception in the second DL SF followed by UL grant reception in the third DL SF followed by data transmission in the third UL SF.

10. The UE according to claim 9, wherein, when the scheduled cell is not a UL SF at the timing of the second UL SF, the third DL SF is reset to DL SF timing closest to the second DL SF, including the second DL SF, in the specific UL-DL configuration, the DL SF timing following the second DL SF.

11. The UE according to claim 7, wherein subframe configurations according to the UL-DL configuration are defined as follows,

| Uplink-downlink | Subframe number | | | | | | | | | |
|---|---|---|---|---|---|---|---|---|---|---|
| configuration | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D | wherein D denotes a downlink subframe, S denotes a special subframe and U denotes an uplink subframe.

12. The UE according to claim 7, wherein the specific UL-DL configuration is a UL-DL configuration having a smallest number of Us from among UL-DL configurations in which SFs, in which the scheduling cell or the scheduled cell corresponds to U, are all set to U.

* * * * *